United States Patent
Matsui et al.

(10) Patent No.: US 8,953,676 B2
(45) Date of Patent: Feb. 10, 2015

(54) INFORMATION PROCESSING APPARATUS, COMPUTER-READABLE STORAGE MEDIUM STORING IMAGE TRANSMISSION PROGRAM, AND COMPUTER-READABLE NON TRANSITORY STORAGE MEDIUM STORING IMAGE DISPLAY PROGRAM

(75) Inventors: Kazuki Matsui, Kawasaki (JP); Kenichi Horio, Kawasaki (JP); Tomoharu Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 13/165,075

(22) Filed: Jun. 21, 2011

(65) Prior Publication Data
US 2012/0002715 A1    Jan. 5, 2012

(30) Foreign Application Priority Data

Jul. 1, 2010 (JP) .................................. 2010-151492

(51) Int. Cl.
*H04N 7/12* (2006.01)
*H04N 11/02* (2006.01)
(Continued)

(52) U.S. Cl.
CPC ..... *H04N 19/00127* (2013.01); *G09G 2340/02* (2013.01); *H04N 19/0026* (2013.01); *C09G 2380/06* (2013.01); *H04N 19/00145* (2013.01); *H04N 19/00545* (2013.01); *H04N 19/00078* (2013.01); *G06F 3/1431* (2013.01); *H04N 19/00781* (2013.01); *H04N 19/0023* (2013.01); *H04N 19/00581* (2013.01)
USPC ................. 375/240.1; 375/E07.026

(58) Field of Classification Search
CPC .............................. H04N 7/50; H04N 7/26351
See application file for complete search history.

(56) References Cited

U.S. PATENT DOCUMENTS 5,797,139 A * 8/1998 Amro ..................................... 1/1
2004/0151390 A1   8/2004 Iwamura
(Continued)

FOREIGN PATENT DOCUMENTS

| GB | 2462179 | 2/2010 |
|---|---|---|
| JP | 2004-86550 | 3/2004 |

(Continued)

OTHER PUBLICATIONS

Rahman, A.K.M. Ashikur, "Thin Clients Via Shadow Objects", Advanced Communication Technology, 2004, pp. 1072-1077.

(Continued)

*Primary Examiner* — Dave Czekaj
*Assistant Examiner* — Nam Pham
(74) *Attorney, Agent, or Firm* — Staas & Halsey LLP

(57) ABSTRACT

An information processing apparatus that generates images for displaying a computer execution result on a display unit of a terminal device connected through a network and that transmits the images to the terminal device. The apparatus includes an image memory that holds the images; a first transmitting unit that transmits the images, a detecting unit that detects an area obtained by updating accumulated changes between frames of the images or a frequency of changes between frames of the images, and a second transmitting unit that compresses the images by a compression method and that transmits the compressed images, when the area or the frequency detected by the detecting unit is larger than or equal to a predetermined threshold, the compression method being different from a compression method for the first transmitting unit.

8 Claims, 17 Drawing Sheets

(51) Int. Cl.

| | |
|---|---|
| *H04N 11/04* | (2006.01) |
| *H04N 19/132* | (2014.01) |
| *H04N 19/17* | (2014.01) |
| *H04N 19/137* | (2014.01) |
| *H04N 19/46* | (2014.01) |
| *H04N 19/12* | (2014.01) |
| *G06F 3/14* | (2006.01) |
| *H04N 19/61* | (2014.01) |
| *H04N 19/162* | (2014.01) |
| *H04N 19/507* | (2014.01) |

(56) References Cited

U.S. PATENT DOCUMENTS

2007/0098082 A1* 5/2007 Maeda et al. ............ 375/240.26
2008/0170046 A1* 7/2008 Rimon et al. ................. 345/174
2009/0268822 A1* 10/2009 Terada et al. ............ 375/240.16

FOREIGN PATENT DOCUMENTS

| JP | 2009-194626 | 8/2009 |
| JP | 2010-118976 | 5/2010 |
| WO | 2005/029864 A1 | 3/2005 |

OTHER PUBLICATIONS

Search Report issued by the European Patent Office on Oct. 25, 2011 in the corresponding European patent application No. 11170455.7.
Office Action issued by the Japanese Patent Office on Oct. 8, 2013 in the corresponding Japanese patent application No. 2010-151492.

* cited by examiner

INFORMATION PROCESSING APPARATUS, COMPUTER-READABLE STORAGE MEDIUM STORING IMAGE TRANSMISSION PROGRAM, AND COMPUTER-READABLE NON TRANSITORY STORAGE MEDIUM STORING IMAGE DISPLAY PROGRAM

CROSS-REFERENCE TO RELATED APPLICATION

This application is based upon and claims the benefit of priority of the prior Japanese Patent Application No. 2010-151492, filed on Jul. 1, 2010, the entire contents of which are incorporated herein by reference.

FIELD

The embodiments disclosed herein relate to an information processing apparatus, an image transmission program, an image display program, and an image display method.

BACKGROUND

Systems called "thin clients" are known. A thin client system is constructed so that a client is provided with a minimum function and a server manages resources such as applications and files.

In such a thin client system, with a result of processing executed by the server apparatus and/or data held thereby being displayed on the client, the client behaves as if it was playing the main role of executing the processing and/or was holding the data.

For example, International Publication Pamphlet No. 2005/029864 discloses a thin client system in which a server executes an application for tasks, such as document creation and mailing and a client displays a result of the processing of the application. In addition to such task applications, there are demands for client systems to be extensively applied to an application for processing high-definition images in CAD (computer-aided design), an application for handling moving images, and so on.

However, protocols, such as an RDP (Remote Desktop Protocol), used for communication in a thin client system, and an RFB (Remote Frame Buffer) protocol used for VNC (Virtual Network Computing) are used to deal with large amounts of data of images and moving images, there is a problem in that response to operations executed by the client deteriorates. Such a problem is not only limited to cases in which images and moving images are handled, but is also common to cases in which a large amount of data is transmitted between a client and a server in a client system to update a screen.

Thus, as examples of technology for improving the operation response, Japanese Unexamined Patent Application Publication Nos. 2009-194626 and 2010-118976 discloses related technologies. In the technologies, a server hooks outputs of a specific media application during processing and transmits data handled by the media application to a client. In turn, the client performs playback processing on data handled by the media application that runs on the server.

SUMMARY

In accordance with an aspect of the embodiments, an information processing apparatus that generates images for displaying a computer execution result on a display unit of a terminal device connected through a network and that transmits the images to the terminal device, the apparatus includes an image memory that holds the images; a first transmitting unit that transmits the images; a detecting unit that detects an area obtained by updating accumulated changes between frames of the images or a frequency of changes between frames of the images; and a second transmitting unit that compresses the images by a compression method and that transmits the compressed images, when the area or the frequency detected by the detecting unit is larger than or equal to a predetermined threshold, the compression method being different from a compression method for the first transmitting unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

The present inventors have paid attention to the situation in which the related technologies described above can provide their advantages in only environments that are dependent on a specific media application and thus have a problem in that versatility of a thin client declines.

That is, the related technologies described above are based on the premise that a media application to be installed on the server and the client is modified or a pre-modified media application is installed thereon. However, under current situations in which media applications are available from diverse channels, media applications that can be modified are limited. Thus, for the other majority of media applications, it is necessary to use them with the operation responses being deteriorated.

Embodiments of an information processing apparatus, an image transmission program, an image display program, and an image display method according to the present disclosure will be described below in detail with reference to the accompanying drawings. It is, however, to be noted that the embodiments are not intended to limit the technology according to the present disclosure.

Figure 1:
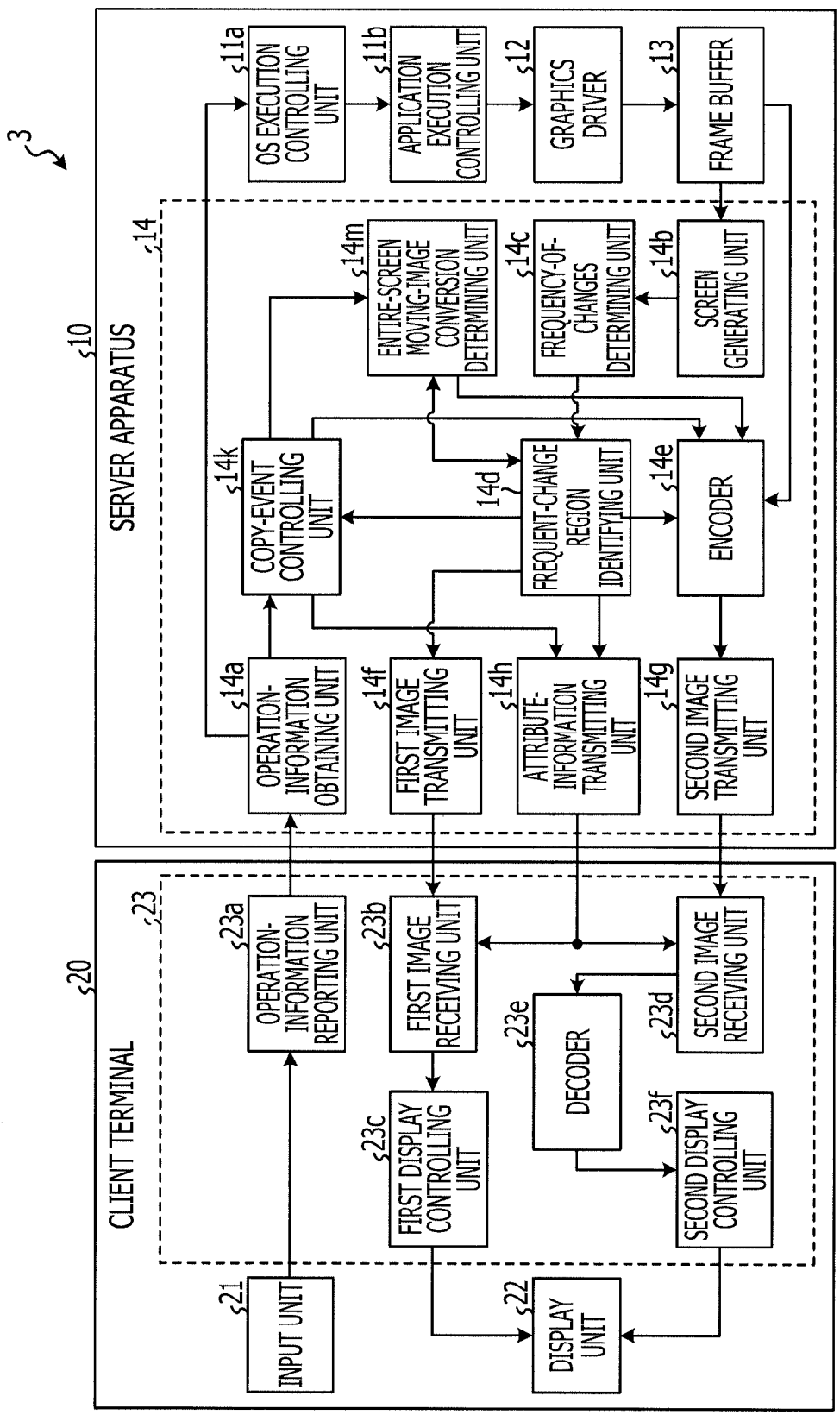
FIG. 1 is a block diagram illustrating the configurations of an apparatus and a device included in a thin client system according to a first embodiment.

A thin client system according to a first embodiment will be described first. FIG. 1 is a block diagram illustrating the configurations of an apparatus and a device included in the thin client system according to the first embodiment.

In the thin client system 1 illustrated in FIG. 1, a server apparatus 10 remotely controls a screen to be displayed on a client terminal 20. That is, in the thin client system 1, with a result of processing executed by the server apparatus 10 and/or data held thereby being displayed on the client terminal 20, the client terminal 20 behaves as if it was playing the main role of executing the processing and/or was holding the data.

As illustrated in FIG. 1, the thin client system 3 has the server apparatus 10 and the client terminal 20. Although a case in which one client terminal 20 is connected to one server apparatus 10 is illustrated in the example of FIG. 1, any number of client terminals may be connected.

The server apparatus 10 and the client terminal 20 are interconnected through a predetermined network so that they can communicate with each other. The predetermined network may be implemented by any type of communication network, such as the Internet, a LAN (local area network), or a VPN (virtual private network), regardless of whether it is wired or wireless network. As one example, a protocol used for communication between the server apparatus 10 and the client terminal 20 is assumed to be an RFB (remote frame buffer) protocol in VNC.

The server apparatus 10 may be a computer that provides a service for remotely controlling a screen to be displayed on the client terminal 20. A remote-screen controlling application for a server is preinstalled or installed on the server apparatus 10. The remote-screen controlling application for a server will hereinafter be referred to as a "server-side remote-screen controlling application".

The server-side remote-screen controlling application has, as its basic function, a function for providing a remote-screen control service. As one example, the server-side remote-screen controlling application obtains information of an operation at the client terminal 20 and causes an application running on the server apparatus 10 to perform processing requested by the operation information. The server-side remote-screen controlling application generates a screen for displaying a result of the processing executed by the application and transmits the generated screen to the client terminal 20. In this case, the server-side remote-screen controlling application transmits an image of a region (i.e., an update rectangle) in which pixels in a portion that has changed relative to a bitmap image that has been displayed on the client terminal 20 exist before the screen is generated this time. While a case in which an image of an update portion has a rectangular shape is described below by way of example, the disclosed apparatus is also applicable to a case in which an image of an update portion has a shape other than the rectangle.

The server-side remote-screen controlling application further has a function for compressing data of a portion involving large motion between frames into data based on a moving-image compression system and transmitting the compressed data to the client terminal 20. For example, the server-side remote-screen controlling application divides the screen, generated from the result of the processing executed by the application, into multiple regions and monitors a frequency of changes in each of the divided regions. The server-side remote-screen controlling application transmits, to the client terminal 20, attribute information of the region(s) in which the frequency of changes exceeds a threshold (the region is hereinafter referred to as a "frequent-change region"). The server-side remote-screen controlling application also encodes the bitmap image of the frequent-change region into data based on an MPEG (Moving Picture Experts Group) system, such as MPEG-2 or MPEG-4, and transmits the encoded data to the client terminal 20. Although a case in which the data is compressed into data based on the MPEG system is described below by way of example, the compression system is not limited thereto. For example, the compression system may be any moving-image compression coding system, for example, Motion-JPEG (Joint Photographic Experts Group) or the like.

The client terminal 20 may be a computer that receives a remote-screen control service provided by the server apparatus 10. Examples of the client terminal 20 include a stationary terminal, such as a personal computer, and a mobile terminal, such as a mobile phone, a PHS (personal handyphone system) phone, or a PDA (personal digital assistant). A remote-screen controlling application for a client is preinstalled or installed to the client terminal 20. The remote-screen controlling application for a client will hereinafter be referred to as a "client-side remote-screen controlling application".

The client-side remote-screen controlling application has a function for reporting, to the server apparatus 10, operation information received via input devices, such as a mouse and/or a keyboard. Examples of the operation information reported by the client-side remote-screen controlling application include left and right clicks, double click, and drag of the mouse, as well as the position and the amount of movement of a mouse cursor which are obtained as a result of a movement operation of the mouse. Other examples of the operation information include the amount of rotation of a mouse wheel and the type of pressed key on the keyboard.

In addition, the client-side remote-screen controlling application has a function for causing an image, received from the server apparatus 10, to be displayed on a given display unit. As one example, upon reception of a bitmap image of an update rectangle from the server apparatus 10, the client-side remote-screen controlling application causes the image of the update rectangle to be displayed at a position changed from the position of the previous bitmap image. As another example, upon receiving the attribute information of a frequent-change region from the server apparatus 10, the client-side remote-screen controlling application sets, as a blank region in which no bitmap image is to be displayed, a region that lies on the display screen and that corresponds to a position included in the attribute information. In addition, upon reception of data based on the moving-image compression system, the client-side remote-screen controlling application decodes the data and displays the decoded data on the blank region.

Next, a description will be given of the configuration of the server apparatus according to the present embodiment. As illustrated in FIG. 1, the server apparatus 10 includes an OS execution controlling unit 11a, an application execution controlling unit 11b, a graphics driver 12, a frame buffer 13, and a server-side remote-screen controller 14. In the example of FIG. 1, in addition to the functional units illustrated in FIG. 1, the server apparatus 10 may further include various functions, such as a function of an input device and a function of a display device, of a known computer.

The OS execution controlling unit 11 a serves as a processing unit that controls execution of an OS (operating system). For example, the OS execution controlling unit 11a detects, from operation information obtained by an operation-information obtaining unit 14a (described below), an instruction for launching an application and a command for an application. As one example, upon detecting that an icon on an application is double-clicked, the OS execution controlling unit 11a issues, to the application execution controlling unit 11b, an instruction for launching the application associated with the icon. As another example, upon detection an operation for requesting execution of a command on an operation screen, i.e., an window, of a running operation, the OS execution controlling unit 11a issues, to the application execution controlling unit 11b, an instruction for execution of the command.

The application execution controlling unit 11b controls execution of an application on the basis of an instruction issued from the OS execution controlling unit 11a. As one example, when the OS execution controlling unit 11a issues an instruction for launching an application or when a running application is instructed to execute a command, the application execution controlling unit 11b launches the corresponding application. The application execution controlling unit 11b issues a request to the graphics driver 12 so as to render, in the frame buffer 13, an image for displaying a processing result obtained by execution of the application. During such issuance of the rendering request to the graphics driver 12, the application execution controlling unit 11b reports the position at which the image for displaying the processing result is to be displayed, together with the image, to the graphics driver 12.

The application executed by the application execution controlling unit 11b may be preinstalled or may be installed after the shipment of the server apparatus 10. The application executed by the application execution controlling unit 11b may also be an application that runs in a network environment based on Java™ or the like.

The graphics driver 12 serves as a processing unit that executes rendering processing on the frame buffer 13. For example, upon receiving a rendering request from the application execution controlling unit 11b, the graphics driver 12 causes an image for displaying an application processing result to be rendered, in a bitmap format, at the rendering position located in the frame buffer 13 and specified by the application. Although a case in which the rendering request is received from the application has been described in this case, a rendering request may also be received from the OS execution controlling unit 11a. For example, upon receiving a mouse-cursor rendering request from the OS execution controlling unit 11a, the graphics driver 12 causes an image for displaying the mouse cursor to be rendered, in a bitmap format, at the rendering position located in the frame buffer 13 and specified by the OS.

The frame buffer 13 serves as a storage device that stores bitmap data rendered by the graphics driver 12. Examples of the frame buffer 13 include a semiconductor memory device, such as a RAM (random access memory, e.g., a VRAM [video random access memory]), a ROM (read only memory), and a flash memory. The frame memory 13 may also be implemented by a storage device, such as a hard disk or an optical disk.

The server-side remote-screen controller 14 serves as a processing unit that offers a remote-screen control service to the client terminal 20 via the server-side remote-screen controlling application. As illustrated in FIG. 1, the server-side remote-screen controller 14 includes an operation-information obtaining unit 14a, a screen generating unit 14b, a frequency-of-changes determining unit 14c, a frequent-change region identifying unit 14d, an encoder 14e, a first image transmitting unit 14f, and a second image transmitting unit 14g. The server-side remote-screen controller 14 further includes an attribute-information transmitting unit 14h, a copy-event controlling unit 14k, and an entire-screen moving-image conversion determining unit 14m.

The operation-information obtaining unit 14a serves as a processing unit that obtains operation information from the client terminal 20. Examples of the operation information include left and right clicks, double click, and drag of the mouse, as well as the position and the amount of movement of the mouse cursor which are obtained as a result of a movement operation of the mouse. Other examples of the operation information include the amount of rotation of the mouse wheel and the type of pressed key on the keyboard.

The screen generating unit 14b serves as a processing unit that generates an image on a screen to be displayed on a display unit 22 of the client terminal 20. For example, each time the graphics driver 12 stores bitmap data in the frame buffer 13, the screen generating unit 14b stars processing as described below. That is, the screen generating unit 14b compares a desktop screen displayed on the client terminal 20 during previous frame generation with a desktop screen written in the frame buffer 13 during current frame generation. Thereafter, the screen generating unit 14b generates an image of an update rectangle, which is obtained by coupling pixels in a portion that has changed from a previous frame and shaping the coupled pixels into a rectangle, and then generates a placket for transmitting the update rectangle.

The frequency-of-changes determining unit 14c serves as a processing unit that determines a frequency of changes between frames for each of regions obtained by dividing an image rendered in the frame buffer 13. For example, the frequency-of-changes determining unit 14c accumulates the update rectangles, generated by the screen generating unit 14b, in an internal work memory (not illustrated) for a predetermined period of time. In this case, the frequency-of-changes determining unit 14c accumulates attribute information that enables designation of the position and the size of each update rectangle. Examples of the attribute information include the coordinates of an upper-left vertex of the update rectangle and the width and height of the update rectangle. The period of time in which the update rectangles are accumulated is correlated with the accuracy for identifying a frequent-change region, and as the period of time is increased, false detection of a frequent-change region decreases. In this example, it is assumed that images of update rectangles are stored for one second.

In this case, when a predetermined period passes after the images of the update rectangles are accumulated, the frequency-of-changes determining unit 14c determines a frequency of changes on the desktop screen by using a map having sections obtained by dividing the desktop screen to be displayed on the client terminal 20 into a meshed pattern.

Figure 2:
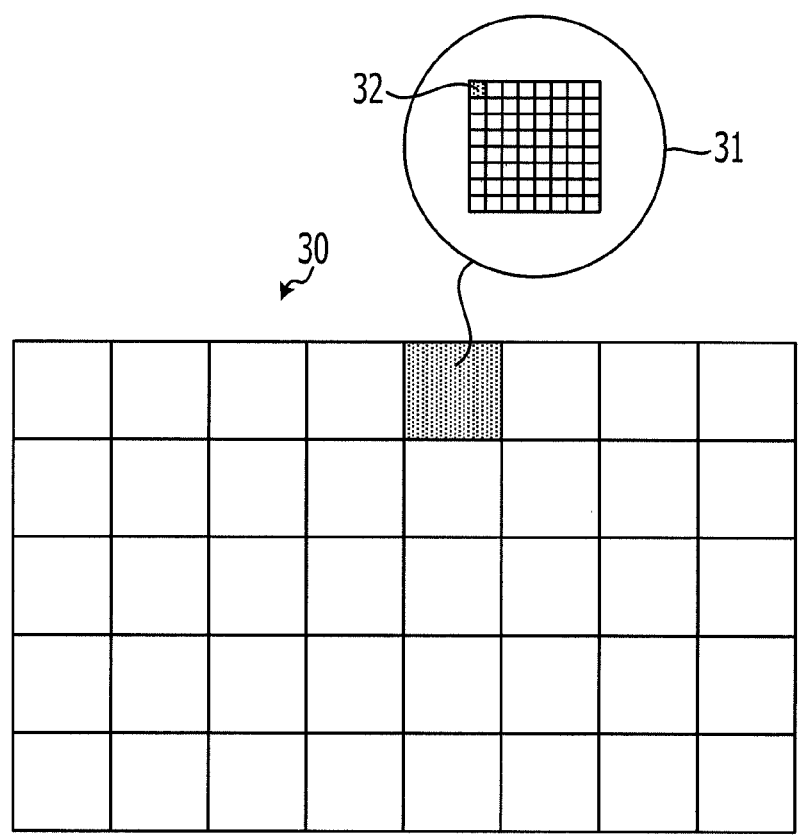
FIG. 2 illustrates how a desktop screen is divided.

FIG. 2 illustrates how a desktop screen is divided. Reference numeral 30 in FIG. 2 represents a frequency-of-changes determination map. Reference numeral 31 in FIG. 2 represents each block included in the map 30. Reference numeral 32 in FIG. 2 represents one of the pixels included in the block 31. In the example illustrated in FIG. 2, it is assumed that the frequency-of-changes determining unit 14c divides the pixels of the map 30 into blocks, each having eight pixels×eight pixels. That is, in this case, each block includes 64 pixels.

In accordance with the positions and the sizes of the update rectangles accumulated in the internal work memory, the frequency-of-changes determining unit 14c sequentially deploys the images of the update rectangles onto the frequency-of-changes determination map. Each time the update rectangle is deployed on the map, the frequency-of-changes determining unit 14c updates an accumulated number of changes in each of the blocks in a portion that overlaps the update rectangle on the map. In this case, when the update rectangle deployed on the map overlaps a predetermined number of pixels included in the block, the frequency-of-changes determining unit 14c increments the number of changes in the block by "1". In this case, a description will be given of an example in which, when the update rectangle overlaps even one pixel included in the block, the number of changes in the block is incremented.

Figure 3A:
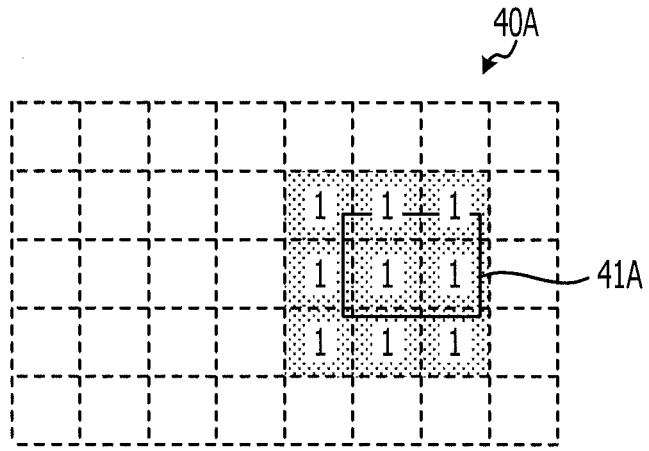
FIG. 3A illustrates how a frequency of changes on the desktop screen is determined.
Figure 3B:
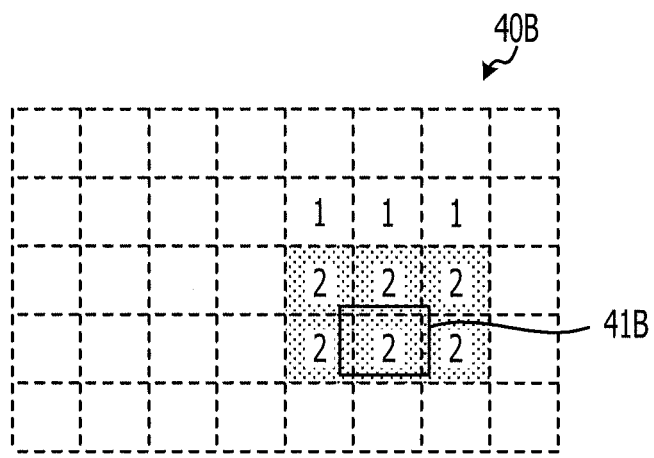
FIG. 3B illustrates how a frequency of changes on the desktop screen is determined.
Figure 3C:
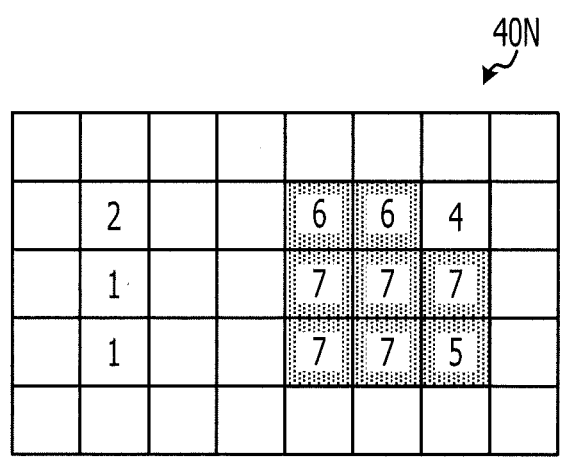
FIG. 3C illustrates how a frequency of changes on the desktop screen is determined.

FIGS. 3A to 3C illustrate how a frequency of changes on the desktop screen is determined. Reference characters 40A, 40B, and 40N in FIGS. 3A, 3B, and 3C each represent a frequency-of-changes determination map. Reference characters 41A and 41B in FIGS. 3A and 3B represent update rectangles, respectively. Numerals indicated in some of the blocks in the map 40A each indicate the number of changes in the block when the update rectangle 41A is deployed. Numerals indicated in some of the blocks in the map 40B each indicate the number of changes in the block when the update rectangle 41B is deployed. Numerals indicated in some of the blocks in the map 40N each indicate the number of changes in the block when all update rectangles accumulated in the internal work memory are deployed. It is assumed that, in FIGS. 3A to 3C, the number of changes in each of the blocks in which no numerals are indicated is zero.

As illustrated in FIG. 3A, when the update rectangle 41A is deployed on the map 40A, the update rectangle 41A overlaps the blocks in a hatched portion. Thus, the frequency-of-changes determining unit 14c increments the number of changes in each of the blocks in the hatched portion by "1". In the example of FIG. 3A, since the number of changes in each block has been zero, the number of changes in the hatched portion is incremented from "0" to "1". In addition, as illustrated in FIG. 3B, when the update rectangle 41B is deployed on the map 40B, the update rectangle 41B overlaps the blocks in a hatched portion. Thus, the frequency-of-changes determining unit 14c increments the number of changes in each of the blocks in the hatched portion by "1". In this case, since the number of changes in each of the blocks has been "1", the number of changes in the hatched portion is changed from "1" to "2". When all of the update rectangles are deployed on the map in the manner described above, a result indicated by the map 40N illustrated in FIG. 3C is obtained.

When all of the update rectangles accumulated in the internal work memory have been deployed on the map, the frequency-of-changes determining unit 14c obtains the blocks in which the number of changes in a predetermined period, i.e., the frequency of changes, exceeds a threshold. In the example of FIG. 3C, when the threshold is assumed to be "4", the blocks in a hatched portion are obtained. As the value of the threshold set is increased, a portion in which a moving is more likely to be displayed on the desktop screen can be encoded by the encoder 14e. With respect to the threshold, an end user may select one of values preset in a stepwise manner by the creator of the server-side remote-screen controlling application or may directly set a value.

Referring back to FIG. 1, the frequent-change region identifying unit 14d serves as a processing unit that identifies a frequent-change region, i.e., a region in which changes are frequently made, on the desktop screen displayed on the client terminal 20.

When the frequency-of-changes determining unit 14c obtains blocks in which the number of changes exceeds the threshold, the frequent-change region identifying unit 14d corrects a coupled block group, which results from coupling of adjacent blocks, into a rectangle. Foe example, the frequent-change region identifying unit 14d derives an interpolation region to be interpolated into a coupled block group and then adds the interpolation region to the coupled block group to thereby correct the coupled block group into a rectangle. The interpolation region may be derived by an algorithm for deriving a region with which a coupled block group is shaped into a rectangle through a minimum amount of interpolation.

Figure 4:
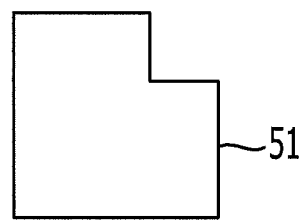
FIG. 4 illustrates how a coupled block group is corrected.
Figure 4:
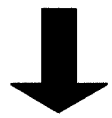
Figure 4:
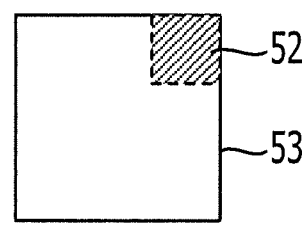

FIG. 4 illustrates how a coupled block group is corrected. Reference numeral 51 in FIG. 4 represents a coupled block group before the correction. Reference numeral 52 in FIG. 4 represents an interpolation region. Reference numeral 53 in FIG. 4 represents a post-correction rectangle. As illustrated in FIG. 4, the frequent-change region identifying unit 14d adds the interpolation region 52 to the coupled block group 51 to thereby correct the coupled block group 51 into the rectangle 53. At this point, however, rectangle combination described below is not completed and thus the rectangle 53 has not been determined as a frequent-change region yet. Hence, the post-correction rectangle is hereinafter referred to as a "frequent-change region candidate".

When multiple frequent-change region candidates exist, the frequent-change region identifying unit 14d combines the frequent-change region candidates between which the distance is smaller than or equal to a predetermined value into a rectangle including the candidates. The expression "distance between the frequent-change region candidates" as used herein refers to a smallest one of the distances between the post-correction rectangles. For example, the frequent-change region identifying unit 14d derives an interpolation region to be fit into a gap between the frequent-change region candidates and adds the interpolation region to the frequent-change region candidates, to thereby combine the frequent-change region candidates into a rectangle including the candidates. The interpolation region may be derived by an algorithm for deriving a region with which frequent-change region candidates are shaped into a combination through a minimum amount of interpolation therebetween.

Figure 5:
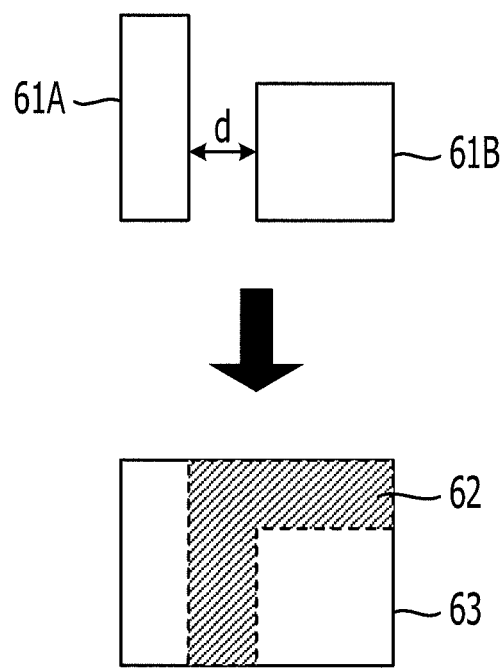
FIG. 5 illustrates how frequent-change region candidates are combined.

FIG. 5 illustrates how frequent-change region candidates are combined. Reference characters 61A and 61B in FIG. 5 represent frequent-change region candidates, respectively. Reference numeral 62 in FIG. 5 represents an interpolation region. Reference numeral 63 indicated in FIG. 5 represents a combination of the frequent-change region candidates 61A and 61B. As illustrated in FIG. 5, when a distance d between the frequent-change region candidate 61A and the frequent-change region candidate 61 B is smaller than or equal to a predetermined distance, the frequent-change region identifying unit 14d adds the interpolation region 62 thereto. This creates a combination 63 including the frequent-change region candidates 61A and 61B. The frequent-change region identifying unit 14d identifies the thus-created combination as a frequent-change region.

When a frequent-change region is identified as described above, the frequent-change region identifying unit 14d outputs, to the attribute-information transmitting unit 14h, attribute information that enables designation of the position and the size of the frequent-change region. The attribute-information transmitting unit 14h then reports the attribute information of the frequent-change region to the client terminal 20, so that a portion that is included in bitmap data of the desktop screen to be displayed on the client terminal 20 and that corresponds to the frequent-change region is displayed blank. Thereafter, the frequent-change region identifying unit 14d adds, to the entire-screen moving-image conversion determination map (described below), the number of changes in each of the blocks mapped in the internal work memory and subsequently clears the map. The frequent-change region identifying unit 14d registers the attribute information of the frequent-change region into the internal work memory.

Each time the screen generating unit 14b generates an update rectangle, the frequent-change region identifying unit 14d determines whether or not the update rectangle is included in the frequent-change region stored in the internal work memory, i.e., is included in a region of a moving image that is being transmitted by the second image transmitting unit 14g. When the update rectangle is not included in the frequent-change region, the frequent-change region identifying unit 14d causes the first image transmitting unit 14f to transmit the image of the update rectangle and the attribute information thereof. On the other hand, when the update rectangle is included in the frequent-change region, the frequent-change region identifying unit 14d does not, in principle, cause the first image transmitting unit 14f to transmit the image of the update rectangle and the attribute information. When the update rectangle is a mouse-related one rendered by the OS execution controlling unit 11a, the image and the attribute information of an update image related to the mouse may be transmitted exceptionally.

Each time bitmap data is rendered in the frame buffer 13, the frequent-change region identifying unit 14d determines whether or not the attribute information of a frequent-change region is registered in the internal work memory. When the attribute information of a frequent-change region is registered, the frequent-change region identifying unit 14d cuts out a bitmap image of a portion that is included in the bitmap data rendered in the frame buffer 13 and that corresponds to the frequent-change region. The frequent-change region identifying unit 14d then outputs the bitmap image to the encoder 14e.

The encoder 14e serves as a processing unit that encodes an image. For example, the encoder 14e encodes an image of the frequent-change region input from the frequent-change region identifying unit 14d. In this case, at a point when the number of bitmap images of the frequent-change region input from the frequent-change region identifying unit 14d reaches the number of frames from which a stream can be generated, the encoder 14e encodes the bitmap images of the frequent-change regions. An encoding system may be, for example, an MPEG system, such as MPEG-2 or MPEG-4 system, or a Motion-JPEG system.

The first image transmitting unit 14f serves as a processing unit that transmits, to the client terminal 20, the update-rectangle image generated by the screen generating unit 14b and the attribute information. A communication protocol for transmitting the update rectangle is, for example, an RFB protocol in VNC.

The second image transmitting unit 14g serves as a processing unit that transmits, to the client terminal 20, the image encoded by the encoder 14e. A communication protocol for transmitting the encoded image may be, for example, an RTP (Real-time Transport Protocol).

The attribute-information transmitting unit 14h serves as a processing unit that transmits the attribute information of an image to the client terminal 20. For example, when the frequent-change region identifying unit 14d identifies a frequent-change region, the attribute-information transmitting unit 14h transmits, to the client terminal 20, the attribute information that enables designation of the position and the size of the frequent-change region. Upon reception of the attribute information, a portion that is included in the bitmap data of the desktop screen to be displayed on the client terminal 20 and that corresponds to the frequent-change region is displayed blank.

Figure 6A:
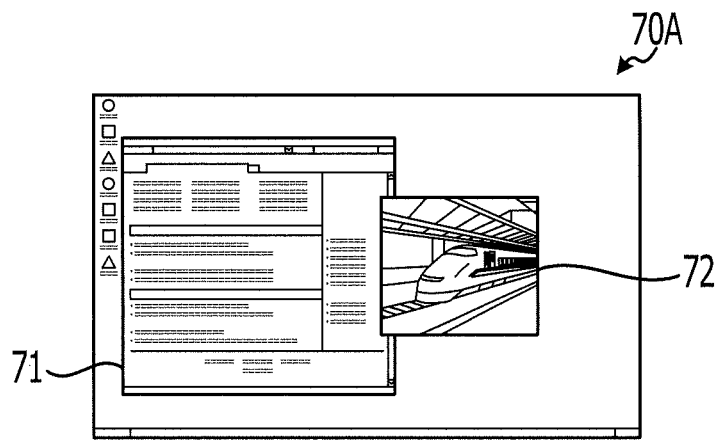
FIG. 6A illustrates how attribute information of a frequent-change region is reported.
Figure 6B:
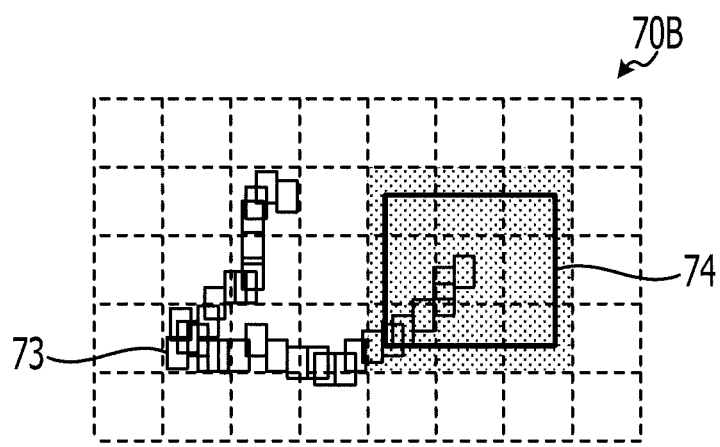
FIG. 6B illustrates how the attribute information of the frequent-change region is reported.
Figure 6C:
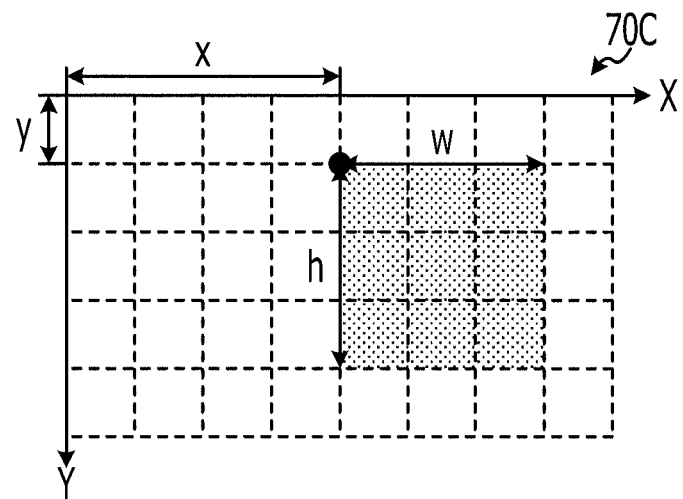
FIG. 6C illustrates how the attribute information of the frequent-change region is reported.

FIGS. 6A to 6C illustrate how the attribute information of a frequent-change region is reported. Reference character 70A in FIG. 6A represents one example of the desktop screen rendered in the frame buffer 13. Reference characters 70B and 70C in FIGS. 6B and 6C each represent a frequency-of-change determination map. Reference numeral 71 in FIG. 6A represents a browser screen. Reference numeral 72 in FIG. 6A represents a moving-image playback screen. Reference numeral 73 in FIG. 6B represents the trace of mouse movement. Reference numeral 74 in FIG. 6B represents a region in which the moving image is played back by an application.

As illustrated in FIG. 6A, the desktop screen 70A includes the browser screen 71 and the moving-image playback screen 72. When changes on the desktop screen 70A are traced time-sequentially, an update rectangle of the browser screen 71 that is a still image is not detected and the mouse movement trace 73 and update rectangles in the moving-image playback region 74 are detected, as illustrated in FIG. 6B. It is assumed that the frequent-change region identifying unit 14d identifies, in the moving-image playback region 74, blocks in which the number of changes exceeds a threshold, i.e., a portion indicated by hatching. In this case, the attribute-information transmitting unit 14h transmits the attribute information of the frequent-change region, specifically, the coordinates (x, y) of an upper-left vertex of the frequent-change region in a hatched portion illustrated in FIG. 6C and the width w and the height h of the frequent-change region, to the client terminal 20. Although a case in which the coordinates of the upper-left vertex are used to represent a point for designating the position of the frequent-change region has been described in this case, another vertex may also be used. Instead of a vertex, any point, such as a barycenter, that enables designation of the position of the frequent-change region may also be used. Although a case in which the upper-left vertex on the screen is used as the original of the coordinate axes X and Y has been described in this case, any point on or outside the screen may be used as the origin.

As described above, the server apparatus 10 identifies, as a frequent-change region, a region for which a moving-image compression system is employed, without depending on a specific application. In addition, with respect to a region other than the frequent-change region, the server apparatus 10 transmits an image of a portion in which changes were made, and with respect to the frequent-change region, the server apparatus 10 compresses an image thereof into data based on the moving-image compression system. Accordingly, the server apparatus 10 can reduce the amount of data, while placing emphasis on, of images to be transmitted to the client terminal 20, an image that acts as a source for deterioration of operation response. The server apparatus 10, therefore, can minimize the amount of load of an encoder for performing compression processing and the amount of load of a decoder for performing decoding processing at the terminal device. Thus, the server apparatus 10 makes it possible to improve the operation response, while maintaining the versatility of a thin client.

The server apparatus 10, however, requires a certain amount of time to identify a frequent-change region. Thus, even when changes involving active motion between frames of images are rendered in the frame buffer 13, if the period of time in which the changes are made is short, a region in which the changes are made cannot be identified as a frequent-change region.

Figure 7:
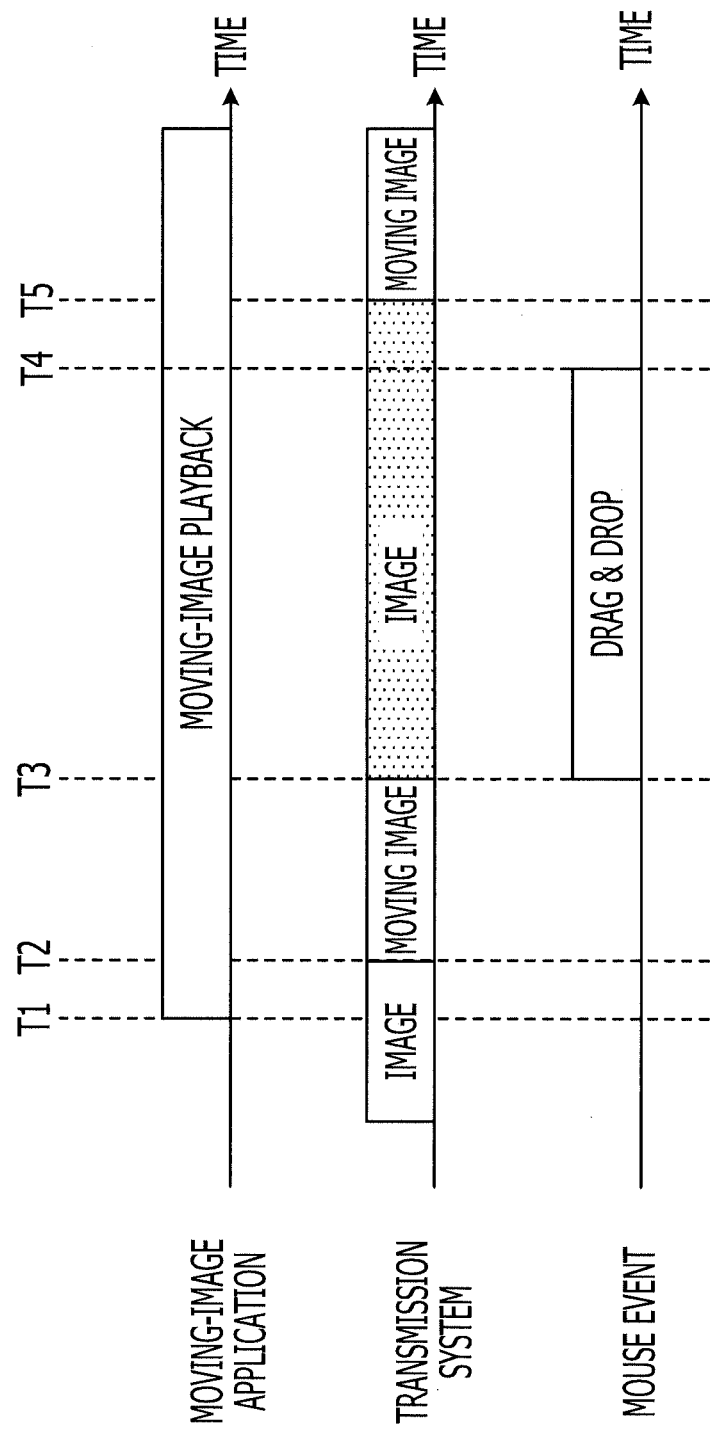
FIG. 7 illustrates one example of an image transmission system based on which a server apparatus transmits an image to a client terminal when a window is moved.

For example, when a window is moved, there are cases in which the motion of the window cannot be traced and a moving image thereof cannot be smoothly displayed on the client terminal 20. FIG. 7 illustrates one example of an image transmission system based on which a server apparatus transmits an image to a client terminal when a window is moved. The example illustrated in FIG. 7 is directed to a case in which a moving-image application plays back a moving image, and the title bar of the window for the moving image is dragged and dropped.

Since the window is stationary until the moving-image application plays back the moving image, as illustrated in FIG. 7, a portion at which changes were made between frames is transmitted from the server apparatus 10 to the client terminal 20 as an update rectangle image. Thereafter, at time T1, the moving-image application starts playback of the moving image. When time T2 is reached, the server apparatus 10 identifies the window as a frequent-change region and starts transmitting the image for the window to the client terminal 20 as a moving image.

At time T3, the tile bar of the window is dragged and dropped to thereby cause the window to start moving. In response, a portion involving active motion is moved in conjunction with the movement of the window, and consequently, the window is not identified as a frequent-change region, even though the moving image is being played back. Even after the movement of the window is stopped at time T4, the window is not identified as a frequent-change region until time T5 is reached. When time T5 is reached, the server apparatus 10 finally identifies the window as a frequent-change region and starts transmitting the image for the window to the client terminal 20 as a moving image.

That is, when the windows is moved, the moving image to be played back by the moving-image application is transmitted to the client terminal 20 as update rectangles for a period of time indicated by a hatched portion in FIG. 7. Consequently, the operation response decreases.

In order to deal with such movement of the window, the server apparatus 10 according to the present embodiment is adapted to trace the movement of the window by generating a copy event. The term "copy event" as used herein refers to an event in which, when an actual window is moved, a copy region that is regarded as a pseudo window is moved along the trace of movement of the mouse to thereby cause the copy region to follow the movement of the window.

That is, the server apparatus 10 according to the present embodiment transmits, to the client terminal 20, the attribute information that enables designation of the position and the size of the copy region following the movement of the window. The server apparatus 10 also converts, in the frame buffer 13, images to be rendered in the copy region into a moving image and transmits the moving image.

With this arrangement, without generation of a large number of update rectangles, an image of the copy region involving active motion can be compressed for transmission to the client terminal 20. Consequently, the operation response when the window is moved can be improved.

However, for example, when the window is moved throughout a majority of the screen on the client terminal 20, the load of the server apparatus 10 in a case in which only a portion of the copy region on the screen is converted into a moving image for transmission to the client terminal 20 may be greater than the load in a case in which the entire screen is converted into a moving image. This is because the identification of a frequent-change region requires that update rectangles accumulated for a predetermined amount of time be mapped in the memory. In particular, in the case of a compact mobile terminal such as a smart phone, since the size of the screen is small, there are cases in which converting the entire screen into a moving image is more advantageous.

Accordingly, for transferring an update portion of a screen rendered in the frame buffer 13 to the client terminal 20, when the movement area in the screen becomes larger than or equal to a threshold and the update frequency becomes higher than or equal to a threshold as a result of the movement of the window, the server apparatus 10 according to the present embodiment converts the entire screen into a moving image for the transfer. With this arrangement, when conversion of the entire screen into a moving image leads to a smaller amount of processing load of the server apparatus 10 according to the present embodiment, the server apparatus 10 can perform the conversion. Thus, the server apparatus 10 according to the present embodiment makes it possible to improve the response to movement of the window.

The copy-event controlling unit 14*k* that achieves the above-described copy event and the entire-screen moving-image conversion determining unit 14*m* that achieves conversion of an entire screen into a moving image will be described below with reference back to FIG. 1. The copy-event controlling unit 14*k* serves as a processing unit that controls generation, execution, and ending of a copy event.

A trigger for generation of a copy event will now be described. The copy-event controlling unit 14*k* determines whether or not the frequent-change region identified by the frequent-change region identifying unit 14*d* is larger than or equal to a predetermined size, for example, a size of 50×50 pixels. In this case, when the frequent-change region is larger than or equal to the predetermined size, the copy-event controlling unit 14*k* further determines whether or not a specific mouse event is detected, for example, whether or not a drag & drop is obtained by the operation-information obtaining unit 14*a*. When a specific mouse event is detected, the copy-event controlling unit 14*k* generates a copy event. Although a case in which whether or not a copy event is to be generated is determined based on a mouse event has been described in this case, whether or not a copy event is to be generated may also be determined based on an operation of a graphics tablet or the keyboard.

When a frequent-change region having a certain size or greater exists, the possibility that a window including a moving image is already rendered in the frame buffer 13 is high. Under such a situation, when an operation for moving the window is obtained, it can be presumed that an operation for moving the window including a moving image has been performed. This arrangement, therefore, makes it possible to generate a copy event at an appropriate timing without collecting any special information from the OS.

A trigger for ending the copy event will be described next. The copy-event controlling unit 14k determines whether or not a specific mouse event is detected. When no more specific mouse event is detected, i.e., when the operation for moving the window is finished, the copy-event controlling unit 14k ends the copy event. When the operation for moving the window is finished, the operation-information obtaining unit 14a obtains operation information indicating that the left click involved in the drag operation is released. When any update rectangle of the mouse cursor is not received for a predetermined period of time, it can also be regarded that the operation for moving the window is finished.

Details of processing executed for a copy event will be described next. When the operation-information obtaining unit 14a obtains the amount of movement of the mouse, the copy-event controlling unit 14k determines the position of a current copy region on the basis of a copy region in which a copy event was executed last time and the amount of mouse movement obtained this time. As in the case of the frequent-change region, the position of the copy region is assumed to be specified by the coordinates of the upper-left vertex and the size of the copy region is assumed to be specified by the width w and the height h of the frequent-change region.

Figure 8:
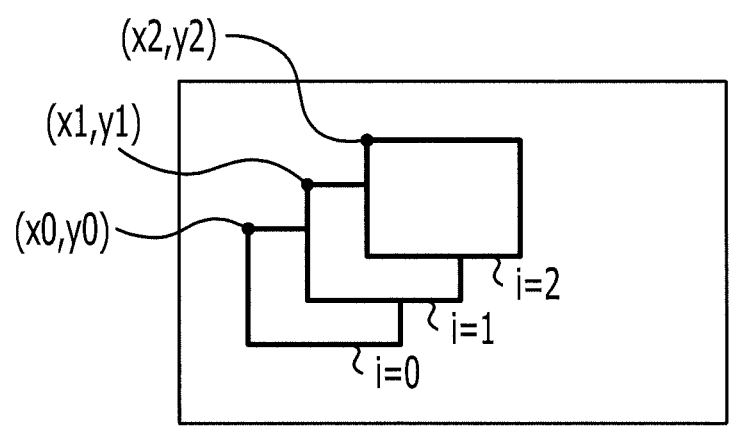
FIG. 8 illustrates a method for determining the position of a copy region.

FIG. 8 illustrates a method for determining the position of a copy region. A region "i=0" illustrated in FIG. 8 is a copy region in which a copy event is executed at time t0. The attribute information of the copy region is the same as the attribute of a frequent-change region when a copy event is generated, that is, the coordinates (x0, y0) of the upper-left vertex and the width w and the height h of the frequent-change region. A region "i=1" illustrated in FIG. 8 is a copy region in which a copy event is executed at time t1. A region "i=2" illustrated in FIG. 8 is a copy region in which a copy event is executed at time t2.

For example, as the position of the copy region "i=1" at time t1 in FIG. 8, the coordinates (x1, y1) of the upper-left vertex are determined by adding the amount of mouse movement obtained at time t1 to the coordinates (x0, y0) of the copy region "i=0" at time t0. For example, as the position of the copy region "i=2" at time t2 in FIG. 8, the coordinates (x2, y2) of the upper-left vertex are determined by adding the amount of mouse movement obtained at time t2 to the coordinates (x1, y1) of the copy region "i=1" at time t1. With respect to the width and the height of the copy region, the width w and the height h of the frequent-change region are continuously used as the copy region for each updated count.

After the attribute information of the copy region is determined as described above, the copy-event controlling unit 14k outputs the attribute information of the copy region to the attribute-information transmitting unit 14h. The attribute-information transmitting unit 14h then transmits the attribute information of the copy region to the client terminal 20.

The copy-event controlling unit 14k also outputs the attribute information of the copy region to the encoder 14e. The encoder 14e sequentially encodes, of the bitmap images rendered in the frame buffer 13, an image whose position and size correspond to those of the copy region. Thereafter, the second image transmitting unit 14g transmits the encoded image to the client terminal 20.

The entire-screen moving-image conversion determining unit 14m is a processing unit that determines whether or not an entire screen rendered in the frame buffer 13 is to be converted into a moving image. When a copy event occurs, the entire-screen moving-image conversion determining unit 14m determines a movement area At and an update frequency Ct by using an entire-screen moving-image conversion determination map mapped in the internal work memory. The term "movement area At" as used herein refers to an area obtained by updating accumulated changes between frames of the images. The term "update frequency" refers to a frequency of changes between frames of images. When no copy event occurs, the window is not moved and thus the processing load of the server apparatus 10 hardly increases. Thus, a determination as to whether or not the entire screen is to be converted into a moving image is not made. In this case, the entire-screen moving-image conversion determination map is cleared.

Figure 9:
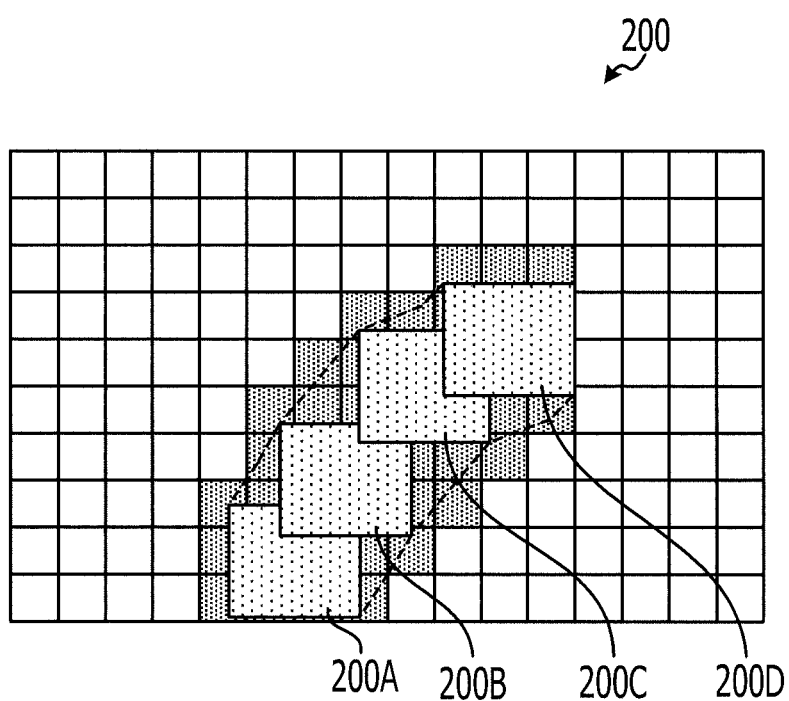
FIG. 9 illustrates one example of a case in which the window is moved.

FIG. 9 illustrates one example of a case in which a window is moved. Reference numeral 200 illustrated in FIG. 9 represents an entire-screen moving-image conversion determination map. Reference character 200A in FIG. 9 represents a position at which the window is present at time t0. Reference character 200B in FIG. 9 represents a position at which the window is present at time t1. Reference numeral 200C in FIG. 9 represents a position at which the window is present at time t2. Reference character 200D in FIG. 9 represents a position at which the window is present at time t3.

Figure 10A:
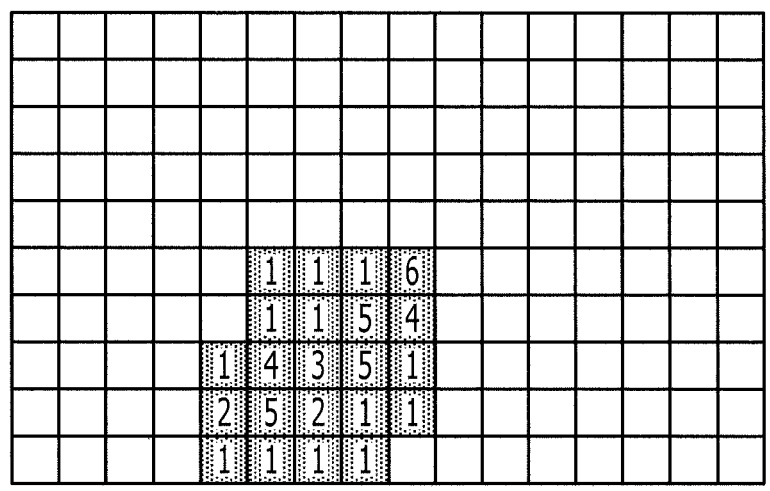
FIG. 10A illustrates an update frequency and a movement area.
Figure 10B:
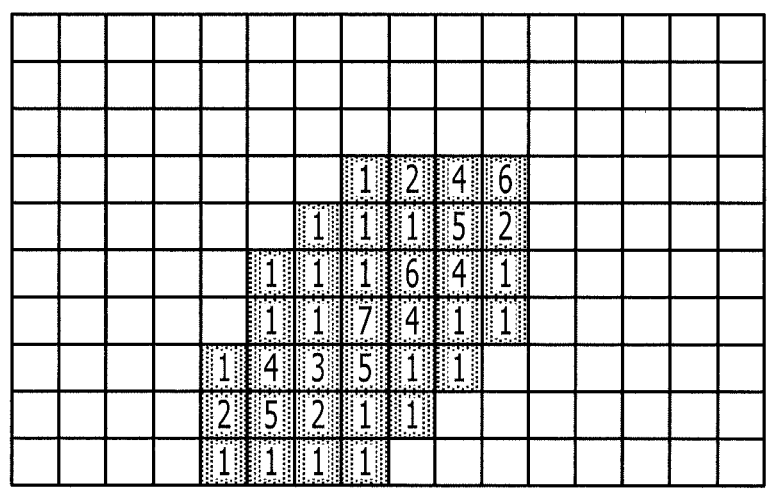
FIG. 10B illustrates the update frequency and the movement area.
Figure 10C:
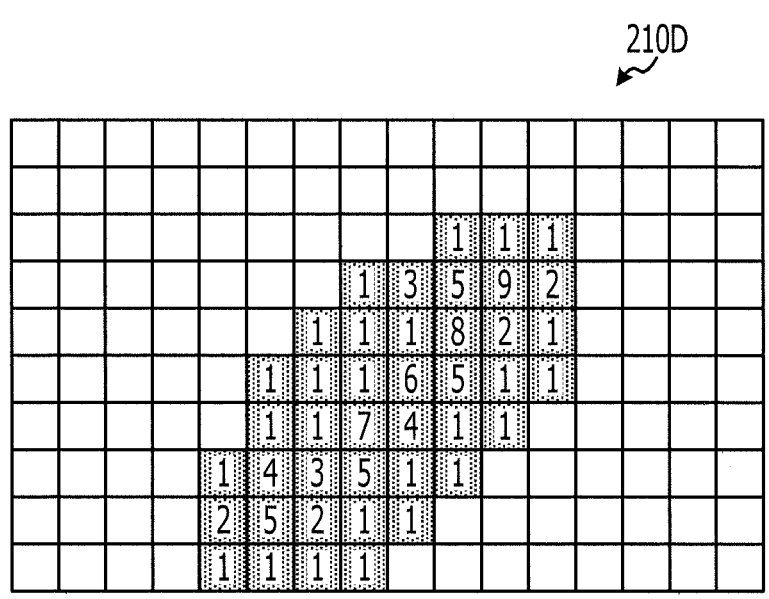
FIG. 10C illustrates the update frequency and the movement area.

FIGS. 10A to 10C illustrate an update frequency and a movement frequency. Reference characters 210B, 210C, and 210C in FIG. 10A, 10B, and 10C represent entire-screen moving-image conversion determination maps. In each of FIGS. 10A to 10C, a portion indicated by hatching includes blocks in which an update rectangle is detected at least once after a copy event is generated, and the total number of blocks in the hatched portion represents the movement area At. Numerals indicated in the blocks on the entire-screen moving-image conversion determination maps 210B, 210C, and 210D each represent a frequency of changes in the block, and the sum of the numerals in all of the blocks represents the update frequency Ct.

In the example of FIG. 10A, the window illustrated in FIG. 9 represents the entire-screen moving-image determination map 210B when the window illustrated in FIG. 9 is present at time t1. In the case of the example of FIG. 10A, the entire-screen moving-image conversion determining unit 14m obtains "22" as the movement area At by adding up the blocks in the hatched portion and also obtains "49" as the update frequency Ct by adding up the numerals in the blocks.

In the example of FIG. 10B, the window illustrated in FIG. 9 represents the entire-screen moving-image determination map 210C when the window illustrated in FIG. 9 is present at time t2. In the case of the example of FIG. 10B, the entire-screen moving-image conversion determining unit 14m obtains "36" as the movement area At by adding up the blocks in the hatched portion and also obtains "82" as the update frequency Ct by adding up the numerals in the blocks.

In the example of FIG. 10C, the window illustrated in FIG. 9 represents the entire-screen moving-image determination map 210D when the window illustrated in FIG. 9 is present at time t3. In the case of the example of FIG. 10C, the entire-screen moving-image conversion determining unit 14m obtains "42" as the movement area At by adding up the blocks in the hatched portion and also obtains "98" as the update frequency Ct by adding up the numerals in the blocks.

After obtaining the movement area At and the update frequency Ct in the manner described above, the entire-screen moving-image conversion determining unit 14m determines whether or not the update frequency Ct is lower than a threshold C. When the update frequency Ct is lower than the threshold C, the entire-screen moving-image conversion determining unit 14m further determines whether or not the movement area At is smaller than a threshold A2. On the other hand, when the update frequency Ct is higher than or equal to the threshold C, the entire-screen moving-image conversion determining unit 14m further determines whether or not the movement area At is smaller than a threshold A1.

In this case, the value of the threshold A1 compared with the movement area At when the update frequency Ct is higher than or equal to the threshold C is smaller than the threshold A2 compared with the movement area At when the update frequency Ct is lower than the threshold C. The reason is to set logic for determination such that, when a window including a moving image moves to some extent, the entire screen is converted into a moving image, and when a window with a still image moves to a certain degree, the entire screen is not converted into a moving image, in order to minimize the amount of load of the server apparatus 10.

In this case, it is preferable that the threshold C compared with the update frequency Ct have a value with which a determination can be made as to whether or not the window illustrated in FIG. 9 includes a moving image. It is also preferable that the threshold A1 compared with the movement area At have a value with which the amount of movement of a window including a moving image exceeds the amount of processing load of the server apparatus 10 when the entire screen is converted into a moving image. It is also preferable that the threshold A2 compared with the movement area At have a value with which the amount of movement of a window that is a still image exceeds the amount of processing load of the server apparatus 10 when the entire screen is converted into a moving image. The threshold A1 and the threshold A2 are assumed to have a relationship of A1<A2.

For example, it is assumed that the threshold C is 50, the threshold A1 is 30, and the threshold A2 is 50. In the example of FIG. 10A, since the update frequency Ct is 49, it follows the update frequency Ct<the threshold C, and since the movement area At is 22, it follows that the movement area At<the threshold A2. Thus, at the point in time t1, the window illustrated in FIG. 9 is not converted into a moving image. In the example of FIG. 10B, since the update frequency Ct is 82, it follows that the update frequency Ct the threshold C, and since the movement area At is 36, it follows that the movement area At the threshold A1. Thus, in the case of the window illustrated in FIG. 9, it is determined that, at the point in time t2, the entire screen is converted into a moving image. Since the entire screen in the case of the window illustrated in FIG. 9 is converted into a moving image at the point in time t2, the determination of the update frequency Ct "98" and the movement area At "42" and the determination as to whether or not the entire screen is to be converted into a moving image are not performed in practice.

When the movement area At is larger than or equal to the threshold A1 or when the movement area At is larger than or equal to the threshold A2, the entire-screen moving-image conversion determining unit 14m determines that the entire screen is to be converted into a moving image. In this case, the entire-screen moving-image conversion determining unit 14m instructs the encoder 14e so as to encode the entire screen rendered in the frame buffer 13. The encoder 14e sequentially encodes the entire bitmap image rendered in the frame buffer 13. The second image transmitting unit 14g then transmits the encoded image to the client terminal 20. When no more specific mouse event is detected, i.e., when the movement of the window is finished, the conversion of the entire screen into a moving image is finished and the operation returns to its original mode for transmitting update rectangles.

The OS execution controlling unit 11a, the application execution controlling unit 11b, the graphics driver 12, and the server-side remote-screen controller 14 may be implemented by various types of integrated circuit or electronic circuit. At least one of the functional units included in the server-side remote-screen controller 14 may also be implemented by another integrated circuit or electronic circuit. Examples of the integrated circuit include an ASIC (application specific integrated circuit) and an FPGA (field programmable gate array). Examples of the electronic circuit include a CPU (central processing unit) and an MPU (micro processing unit).

Next, a description will be given of the configuration of the client terminal according to the present embodiment. As illustrated in FIG. 1, the client terminal 20 has an input unit 21, a display unit 22, and a client-side remote-screen controller 23. In the example of FIG. 1, in addition to the functional units illustrated in FIG. 1, the client terminal 20 may further include various functions, such as a function of an input device and a function of a display device, of a known computer.

The input unit 21 serves as an input device that receives various types of information, for example, an instruction input to the client-side remote-screen controller 23. The input unit 21 includes, for example, a keyboard and a mouse. The display unit 22 realizes a pointing device function in cooperation with the mouse.

The display unit 22 serves as a display device that displays various types of information, such as a desktop screen transmitted from the server apparatus 10. The display unit 22 includes, for example, a monitor, a display, or a touch panel.

The client-side remote-screen controller 23 serves as a processing unit that receives a remote-screen control service, supplied from the server apparatus 10, via the client-side remote-screen controlling application. As illustrated in FIG. 1, the client-side remote-screen controller 23 has an operation-information reporting unit 23a, a first image receiving unit 23b, a first display controlling unit 23c, a second image receiving unit 23d, a decoder 23e, and a second display controlling unit 23f.

The operation-information reporting unit 23a serves as a processing unit that reports, to the server apparatus 10, operation information input via the input unit 21. Examples of the operation information reported by the operation-information reporting unit 23a include left and right clicks, double click, and drag of the mouse, as well as the position and the amount of movement of a mouse cursor which are obtained as a result of a movement operation of the mouse. Other examples of the operation information reported by the operation-information reporting unit 23a include the amount of rotation of a mouse wheel and the type of pressed key on the keyboard.

The first image receiving unit 23b serves as a processing unit that receives update rectangle images and the attribute information transmitted from the first image transmitting unit 14f in the server apparatus 10. The first image receiving unit 23b also receives the attribute information of a frequent-change region and the attribute information of a copy region, the attribute information being transmitted from the attribute-information transmitting unit 14h in the server apparatus 10.

The first display controlling unit 23c serves as a processing unit that causes the update rectangle images, received by the first image receiving unit 23b, to be displayed on the display unit 22. As one example, the first display controlling unit 23c causes a bitmap image of an update rectangle to be displayed on a screen region that lies on the display unit 22 and that corresponds to the position and the size included in the attribute information of the update rectangle received by the first image receiving unit 23b.

As another example, when the first image receiving unit 23b receives the attribute information of a frequent-change region or the attribute information of a copy region, the first display controlling unit 23c sets, as a blank region in which no bitmap image is to be displayed, a screen region that lies on the display unit 22 and that corresponds to the position and the size included in the attribute information of the frequent-change region or the attribute information of the copy region.

The second image receiving unit 23d serves as a processing unit that receives the encoded image of the frequent-change region, the copy region, or the entire screen, the encoded image being transmitted by the second image transmitting unit 14g in the server apparatus 10.

The decoder 23e serves as a processing unit that decodes the encoded image of the frequent-change region, the copy region, or the entire screen, the encoded image being received by the second image receiving unit 23d. The decoder 23e may employ a decoding system corresponding to the encoding system employed by the server apparatus 10.

The second display controlling unit 23f serves as a processing unit that causes the image decoded by the decoder 23e to be displayed on the display unit 22.

As one example, when the decoded image of a frequent-change region is input from the decoder 23e, the second display controlling unit 23f causes the decoded image to be displayed on the screen region that lies on the display unit 22 and that is set as a blank region by the first display controlling unit 23c.

As another example, when the decoded image of a copy region is input from the decoder 23e, the second display controlling unit 23f causes the decoded image to be displayed on the screen region that lies on the display unit 22 and that is set as a blank region by the first display controlling unit 23c.

As a further example, when the decoded image of an entire screen is input from the decoder 23e, the second display controlling unit 23f causes the decoded image of the entire screen to be displayed on the display unit 22.

The client-side remote-screen controller 23 may be implemented by various types of integrated circuit or electronic circuit. At least one of the functional units included in the client-side remote-screen controller 23 may also be implemented by another integrated circuit or electronic circuit. Examples of the integrated circuit include an ASIC (application specific integrated circuit) and an FPGA (field programmable gate array). Examples of the electronic circuit include a CPU (central processing unit) and an MPU (micro processing unit).

Figure 11:
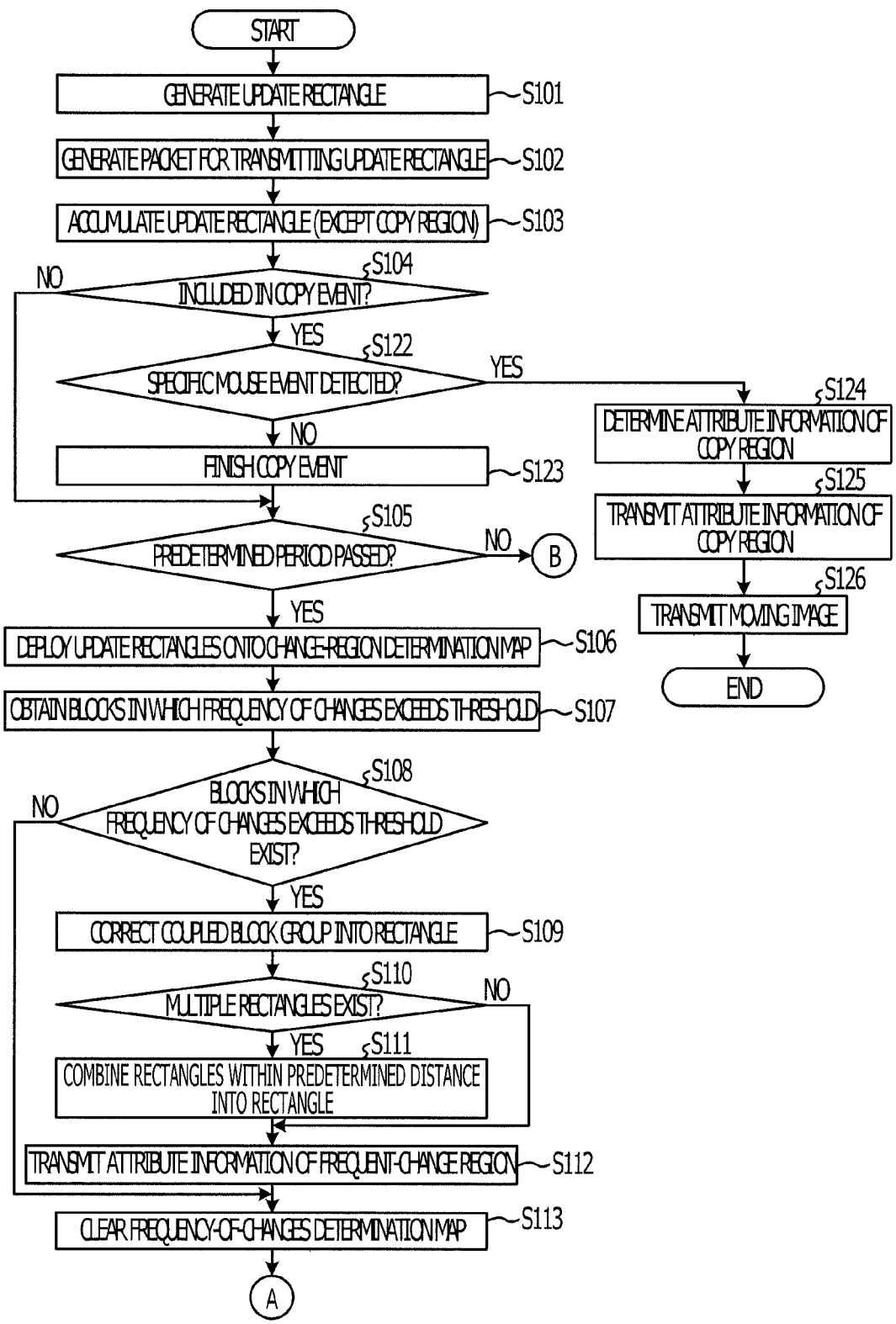
FIG. 11 is a flowchart of a procedure of image transmission processing according to the first embodiment.
Figure 12:
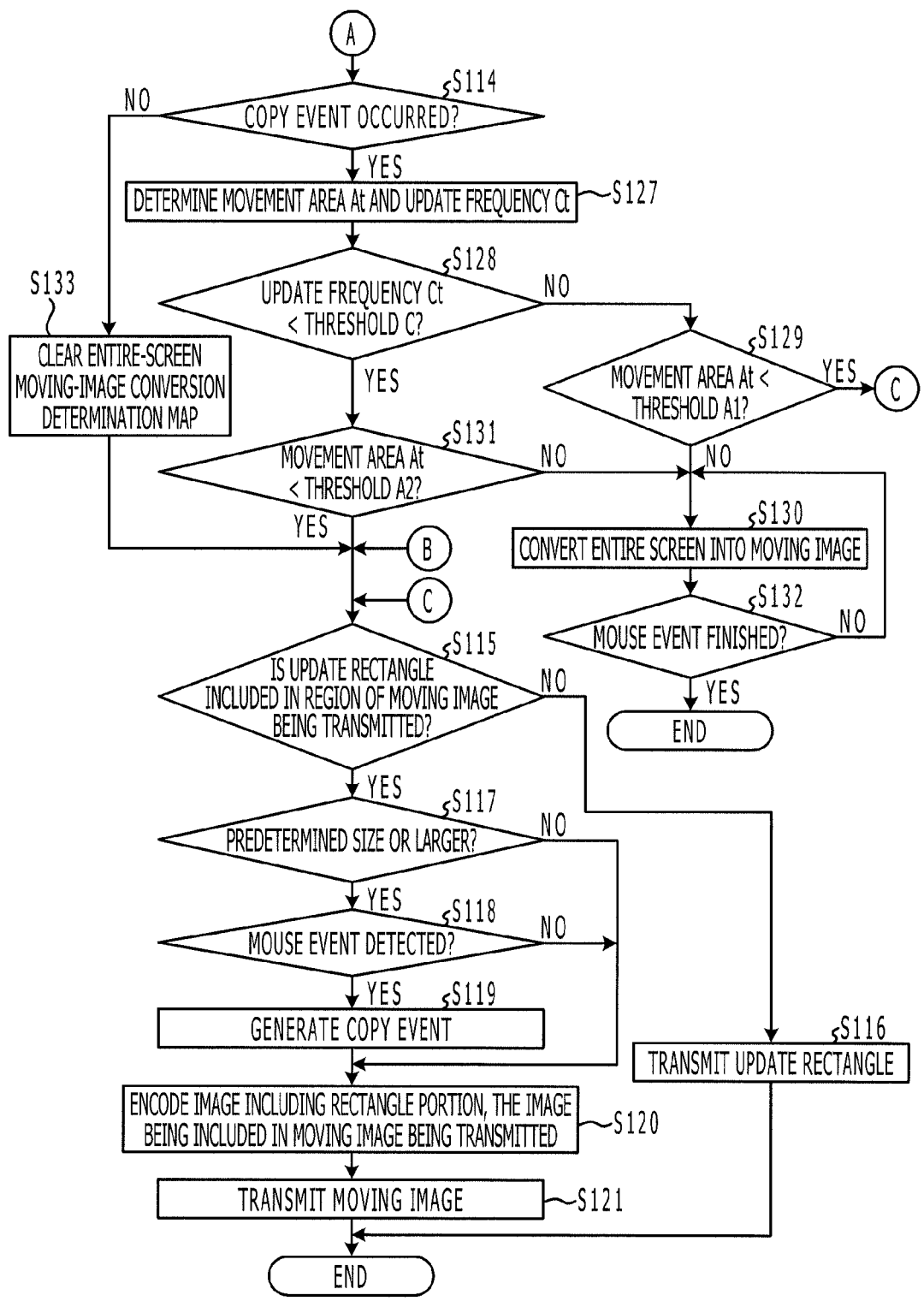
FIG. 12 is a flowchart of the procedure of the image transmission processing according to the first embodiment.

Next, a description will be given of a flow of processing of a thin client system according to the present embodiment. FIGS. 11 and 12 are flowcharts of a procedure of image transmission processing according to the first embodiment. The image transmission processing is executed by the server apparatus 10 and is started when bitmap data is rendered in the frame buffer 13.

In FIG. 11, when bitmap data is rendered in the frame buffer 13, in operation S101, the screen generating unit 14b generates an image of an update rectangle, which is obtained by coupling pixels in a portion that has changed from a previous frame and shaping the coupled pixels into a rectangle. In operation S102, using the generated update-rectangle image, the screen generating unit 14b generates a packet for transmitting the update rectangle.

Subsequently, in operation S103, the frequency-of-changes determining unit 14c accumulates, in the internal work memory (not illustrated), the update rectangle generated by the screen generating unit 14b. In this case, an update rectangle of a copy region is not accumulated in the internal work memory in order to reduce the amount of processing for identifying a frequent-change region.

In operation S104, the frequency-of-changes determining unit 14c determines whether or not the update rectangle is included in a region in a copy event. When the update region is not included in a region in a copy event (i.e., negative in operation S104), the process proceeds to operation S105 in which the frequency-of-changes determining unit 14c determines whether or not a predetermined period of time has passed after the start of the update-rectangle accumulation.

When the predetermined period of time has not passed after the start of the update-rectangle accumulation (i.e., negative in operation S105), the process skips subsequent processing for identifying a frequent-change region and proceeds to operation S115 in FIG. 12.

On the other hand, when the predetermined period of time has passed after the start of the update-rectangle accumulation (i.e., affirmative in operation S105), the process proceeds to operation S106. In operation S106, in accordance with the positions and the sizes of the update rectangles accumulated in the internal work memory, the frequency-of-changes determining unit 14c sequentially deploys the images of the update rectangles onto a frequency-of-changes determination map. Subsequently, in operation S107, the frequency-of-changes determining unit 14c obtains, of the blocks included in the frequency-of-changes determination map, the blocks in which the frequency of changes exceeds a threshold.

Thereafter, in operation S108, the frequent-change region identifying unit 14d determines whether or not the frequency-of-changes determining unit 14c has obtained the blocks in which the frequency of changes exceeds the threshold. When blocks in which the frequency of changes exceeds the threshold do not exist (i.e., negative in operation S108), this means that a frequent-change region does not exist on the desktop screen. Thus, the process skips the subsequent processing for identifying a frequent-change region and proceeds to operation S113.

On the other hand, when blocks in which the frequency of changes exceeds the threshold exist (i.e., affirmative in operation S108), the process proceeds to operation S109 in which the frequent-change region identifying unit 14d corrects the coupled block group, which is obtained by coupling the adjacent blocks, into a rectangle.

When multiple post-correction rectangles exist, i.e., when multiple frequent-change region candidates exist (i.e., affirmative in operation S110), the process proceeds to operation S111. In operation S111, the frequent-change region identifying unit 14d combines the frequent-change region candidates between which the distance is smaller than or equal to a predetermined value into a rectangle including the candidates. When multiple frequent-change region candidates do not exist (i.e., negative in operation S110), the process proceeds to operation S112 without the combination of the rectangles.

Subsequently, in operation S112, the frequent-change region identifying unit 14d transmits, to the client terminal 20, attribute information that enables designation of the position and the size of the frequent-change region. Thereafter, in operation S113, the frequent-change region identifying unit 14d adds, to an entire-screen moving-image conversion determination map, the number of changes in each of the blocks mapped in the internal work memory and subsequently clears the entire-screen moving-image conversion determination map.

When no copy event is generated by the copy-event controlling unit 14k (i.e., negative in operation S114 in FIG. 12), the process proceeds to operation S133 in which the entire-screen moving-image conversion determining unit 14m clears the entire-screen moving-image conversion determination map.

Thereafter, in operation S115, the frequent-change region identifying unit 14d determines whether or not the update rectangle generated by the screen generating unit 14b is included in the frequent-change region stored in the internal work memory, i.e., is included in a region of a moving image that is being transmitted by the second image transmitting unit 14g.

In this case, when the update rectangle is not included in the frequent-change region (i.e., negative in operation S115), the process proceeds to operation S116 in which the first image transmitting unit 14f transmits the image of the update rectangle and the attribute information to the client terminal 20 and then ends the processing.

On the other hand, when the update rectangle is included in the frequent-change region (i.e., affirmative in operation S115), the process proceeds to operation S117 in which the copy-event controlling unit 14k determines whether or not the size of the frequent-change region is larger than or equal to a predetermined size. When the size of the frequent-change region is smaller than the predetermined size (i.e., negative in operation S117), the process proceeds to operation S120 without generation of a copy event.

When the size of the frequent-change region is larger than or equal to the predetermined size (i.e., affirmative in operation S117), the process proceeds to operation S118 in which the copy-event controlling unit 14k further determines whether or not a specific mouse event is detected. When no specific mouse event is detected (i.e., negative in operation S118), the process proceeds to operation S120 without generation of a copy event.

When a specific mouse event is detected (i.e., affirmative in operation S118), the process proceeds to operation S119 in which a copy event is generated. In operation S120, the frequent-change region identifying unit 14d cuts out a bitmap image of a portion that is included in the bitmap data rendered in the frame buffer 13 and that corresponds to the frequent-change region and then causes the encoder 14e to encode the bitmap image. In operation S121, the frequent-change region image encoded by the encoder 14e is transmitted to the client terminal 20. Thereafter, the processing ends.

Referring back to the determination in operation S104 described above, when the update region is included in a region in a copy event (i.e., affirmative in operation S104), the process proceeds to operation S122 in which the copy-event controlling unit 14k determines whether or not a specific mouse event is detected.

When no specific mouse event is detected (i.e., negative in operation S122), the process proceeds to operation S123 in which the copy-event controlling unit 14k finishes the copy event. Thereafter, the process proceeds to operation S105.

On the other hand, when a specific mouse event is detected (i.e., affirmative in operation S122), the process proceeds to operation S124. In operation S124, the copy-event controlling unit 14k determines the position of the copy region in which the copy event is executed this time on the basis of the position of the copy region immediately before the copy region in which the copy event is executed this time and the amount of mouse movement obtained this time.

Subsequently, in operation S125, the attribute-information transmitting unit 14h transmits the attribute information of the copy region to the client terminal 20. In operation S126, the second image transmitting unit 14g transmits an encoded image of the copy region, the encoded image being encoded by the encoder 14e, to the client terminal 20. Thereafter, the processing ends.

Referring back to the determination in operation S114 described above, when a copy event occurs (i.e., affirmative in operation S114), the process proceeds to operation S127 in which the entire-screen moving-image conversion determining unit 14m determines a movement area At and an update frequency Ct by using an entire-screen moving-image conversion determination map. In operation S128, the entire-screen moving-image conversion determining unit 14m determines whether or not the update frequency Ct is lower than a threshold C.

When the update frequency Ct is higher than or equal to the threshold C (i.e., negative in operation S128), the process proceeds to operation S129 in which the entire-screen moving-image conversion determining unit 14m further determines whether or not the movement area At is smaller than a threshold A1. When the movement area At is smaller than the threshold A1 (i.e., affirmative in operation S129), the process proceeds to operation S115.

When the update frequency Ct is lower than the threshold C (i.e., affirmative in operation S128), the process proceeds to operation S131 in which the entire-screen moving-image conversion determining unit 14m further determines whether or not the movement area At is smaller than the threshold A2. When the movement area At is smaller than the threshold A2 (i.e., affirmative in operation S131), the process proceeds to operation S115.

When the movement area At is larger than or equal to the threshold A1 (i.e., negative in operation S129) or the movement area At is larger than or equal to the threshold A2 (negative in operation S131), the process proceeds to operation S130. In operation S130, the entire-screen moving-image conversion determining unit 14m instructs the encoder 14e so as to encode the entire screen rendered in the frame buffer 13.

When no more specific mouse event is detected, i.e., when the movement of the window is finished (affirmative in operation S132), the entire-screen moving-image conversion in operation S131 is finished and the operation returns to its original mode for transmitting update rectangles.

The processing for the frequent-change region identification in operations S105 to S113 described above may be executed independently from the flow illustrated in FIGS. 11 and 12. In such a case, each time a predetermined period of time passes after the start of the update-rectangle accumulation, the processing is started.

The processing in operations S115 and S116 described above may be executed independently from the flow illustrated in FIGS. 11 and 12. In such a case, each time the screen generating unit 14b generates an update rectangle, the processing is started.

The processing in operations S120 and S121 described above may be executed independently from the flow illustrated in FIGS. 11 and 12. In such a case, each time bitmap data is rendered in the frame buffer 13, a determination is made as to whether or not the attribute information of the frequent-change region is registered in the internal work memory. In this case, when the attribute information of the frequent-change region is registered, the processing is started.

As described above, for transferring an update portion of a screen rendered in the frame buffer 13 to the client terminal 20, when the movement area in the screen becomes larger than or equal to a threshold and the update frequency becomes higher than or equal to a threshold as a result of the movement of the window, the server apparatus 10 according to the present embodiment converts the entire screen into a moving image for the transfer. With this arrangement, when conversion of the entire screen into a moving image leads to a smaller amount of processing load of the server apparatus 10 according to the present embodiment, the server apparatus 10 can perform the conversion. Thus, the server apparatus 10 according to the present embodiment makes it possible to improve the response to movement of the window.

Although embodiments of the apparatus according to the present disclosure has been described above, the present invention may also be implemented in various forms other than the embodiments described above. A description below will be given of other embodiments encompassed by the present invention.

Although a case in which the frequent-change region identifying unit 14d clears the frequency-of-changes determination map in accordance with a cycle of the update-rectangle accumulation has been described above in the first embodiment, the trigger for clearing the frequency-of-changes determination map is not limited thereto.

For example, after the frequency of changes in a region identified as a frequent-change region falls below the threshold, the frequent-change region identifying unit 14d may also continuously identify it as the frequent-change region for a predetermined period of time.

Figure 13A:
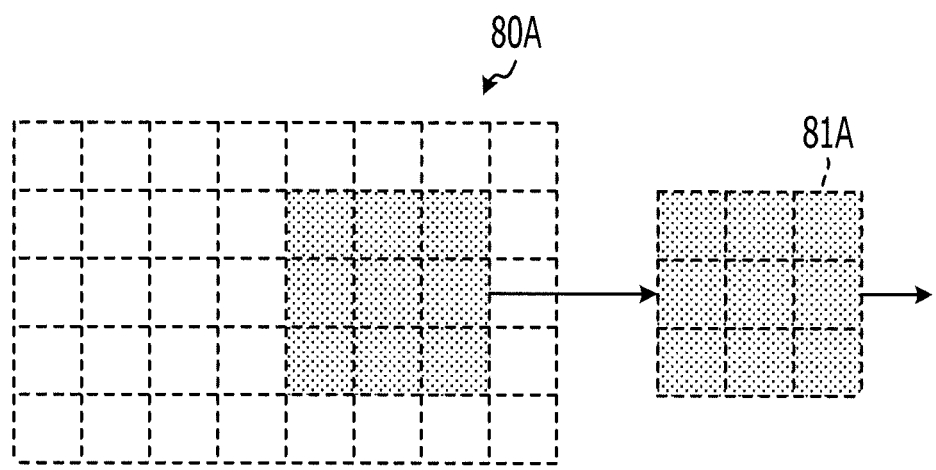
FIG. 13A illustrates how the time at which the map is cleared is extended.
Figure 13B:
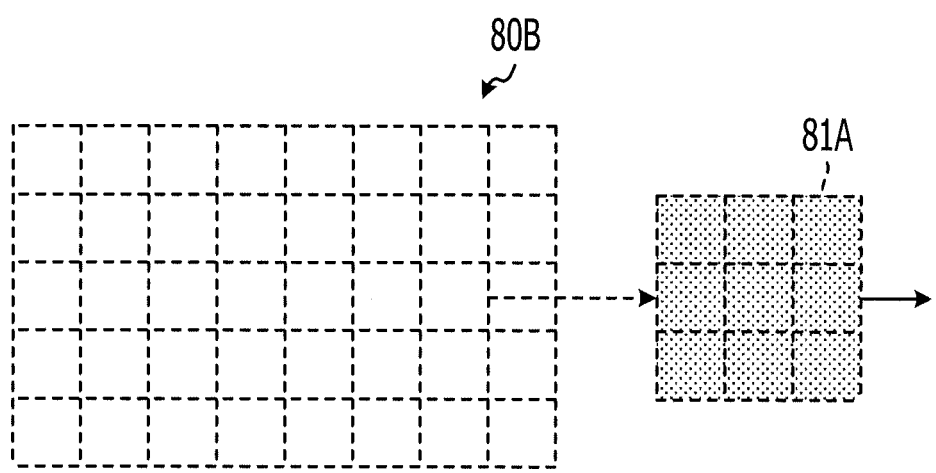
FIG. 13B illustrates how the time at which the map is cleared is extended.

FIGS. 13A and 13B illustrate how the time at which the map is cleared is extended. FIG. 13A illustrates an example of a frequency-of-changes determination map 80A at a point when a frequent-change region is identified for the first time and an identification result 81A of a frequent-change region at that point. FIG. 13B illustrates an example of a frequency-of-changes determination map 80B at a point within a predetermined period of time from when a frequent-change region is identified for the first time and an identification result 81A of the frequent-change region at that point.

As illustrated in FIG. 13A, once a coupled block group in which the number of changes exceeds the threshold is obtained on the map 80A and the identification result 81A of the frequent-change region is obtained, even when a coupled block group in which the number of changes exceeds the threshold is not obtained, the identification result 81A is continuously used for a predetermined period of time. That is, as illustrated in FIG. 13B, even when a coupled block group in which the number of changes exceeds the threshold is not obtained on the map 80B, the identification result 81A of the frequent-change region is continuously used in a predetermined period of time from when the identification result 81A of the frequent-change region is identified for the first time. With respect to the threshold, an end user may select one of values preset in a stepwise manner by the creator of the server-side remote-screen controlling application or may directly set a value.

With this arrangement, even when motion becomes absent intermittently in a region in which a moving image is actually played back, a frequent-change region is not intermittently identified. Consequently, it is possible to prevent intermittent dropping of image frames in the frequent-change region. In addition, since the identification result of the frequent-change region is continuously used, the size of the frequent-change region becomes constant. This makes it possible to reduce the frequency of initializing parameters for the encoding and also makes it possible to reduce the amount of load on the encoder.

For example, when the size of a region identified as a frequent-change region becomes smaller than the size of a region previously identified as a frequent-change region, the frequent-change region identifying unit 14d may perform processing in the following manner. That is, when the degree of such size reduction is smaller than or equal to a predetermined threshold, the frequent-change region identifying unit 14d continuously uses, as a result of the current identification, the region identified as the frequency-change region in the previous identification.

Figure 14A:
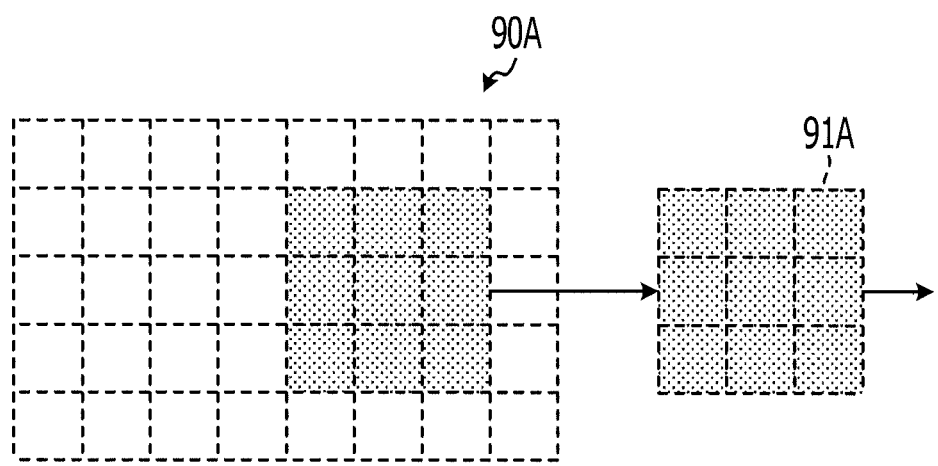
FIG. 14A illustrates suppression of identification-result update with respect to a reduction in a frequent-change region.
Figure 14B:
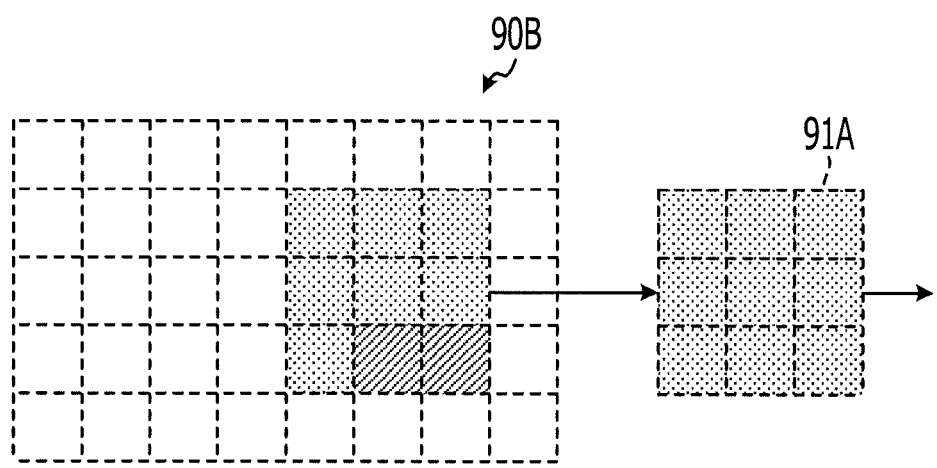
FIG. 14B illustrates suppression of identification-result update with respect to the reduction in the frequent-change region.

FIGS. 14A and 14B illustrate suppression of identification-result update with respect to a reduction in a frequent-change region. FIG. 14A illustrates an example of a frequency-of-changes determination map 90A at time T1 and an identification result 91A of a frequent-change region. FIG. 14B illustrates an example of a frequency-of-changes determination map 90B at time T2 and an identification result 91A of a frequent-change region. Time T1 and time T2 are assumed to have a relationship of T1<T2.

As illustrated in FIG. 14A, once a coupled block group in which the number of changes exceeds the threshold is obtained on the map 90A and the identification result 91A of the frequent-change region is obtained, even when the size of the coupled block group in which the number of changes exceeds the threshold is reduced after time T1, the size of the frequent-change region is not reduced immediately. That is, as illustrated in FIG. 14B, even in a case in which the coupled block group in which the number of changes exceeds the threshold is reduced by a hatched portion (two blocks in the illustrated example), when the area of the hatched portion is smaller than or equal to a predetermined threshold, for example, half the area of the original portion, the identification result 91A of the frequent-change region is continuously used.

With this arrangement, even when motion becomes partly intermittent in a region in which a moving image is actually played back, a frequent-change region is not intermittently identified. Consequently, it is possible to prevent intermittent dropping of image frames in the frequent-change region. In addition, since the identification result of the frequent-change region is continuously used, the size of the frequent-change region becomes constant. This makes it possible to reduce the frequency of initializing parameters for the encoding and also makes it possible to reduce the amount of load on the encoder.

Figure 15A:
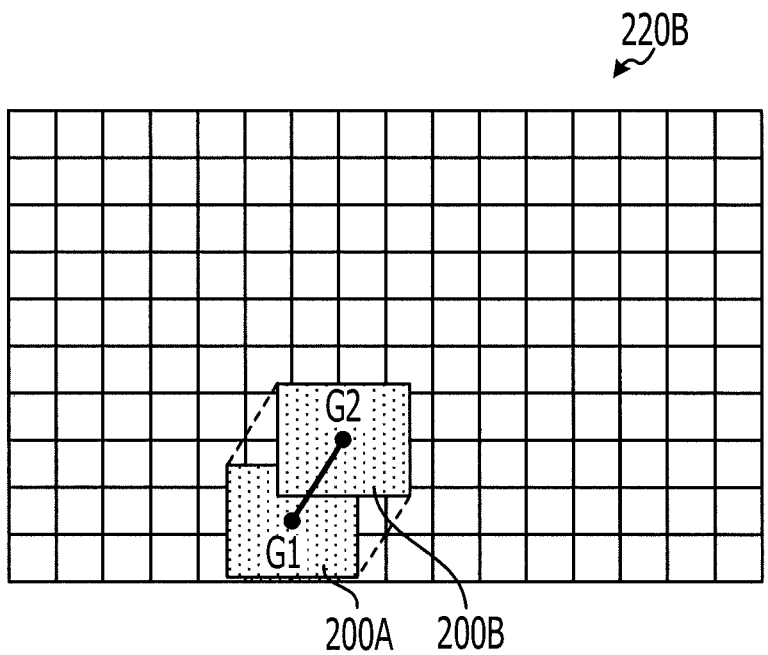
FIG. 15A illustrates the distance between barycenters.
Figure 15B:
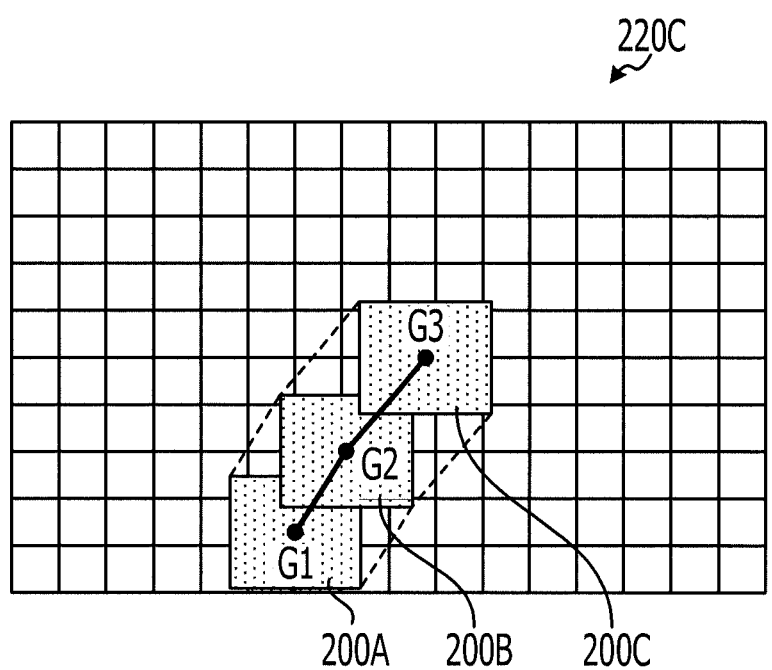
FIG. 15B illustrates the distance between barycenters.

Although the update frequency and the movement area are used in the first embodiment described above, the disclosed apparatus is not limited thereto. For example, the disclosed apparatus may use the distance between the barycenters of windows. FIGS. 15A and 15B illustrate the distance between the barycenters.

Reference numerals 220B and 220C in FIGS. 15A and 15B each represent an entire-screen moving-image conversion determination map. Reference character G1 represents the position at which the window illustrated in FIG. 9 is present at time t0. Reference character G2 represents the position at which the window illustrated in FIG. 9 is present at time t1. Reference character G3 represents the position at which the window illustrated in FIG. 9 is present at time t2. In the example of FIG. 15A, the distance between the barycenter G1 when the window is present at time t0 and the barycenter G2 when the window is present at time t1 is determined. In addition, the disclosed apparatus may compare the distance between the barycenters G1 and G2 with a predetermined threshold. When the barycenter distance exceeds the threshold, the disclosed apparatus may determine that the entire screen is to be converted into a moving image. In the example of FIG. 15B, the distance between the barycenters G2 and G3 is further determined in the same manner as the distance between the barycenters G1 and G2. The disclosed apparatus may further compare a total value of the distance between the barycenters G1 and G2 and the distance between the barycenters G2 and G3 (i.e., the number of pixels involved in the movement) with a predetermined threshold (e.g., 100 pixels), and when the total value of the barycenter distances exceeds the threshold, the disclosed apparatus may determine that the entire screen is to be converted into a moving image.

Although a case in which the entire screen is converted into a moving image when conditions for the update frequency and the movement area are satisfied has been described in the embodiment described above, the disclosed apparatus is not limited thereto. For example, an AND condition and/or an OR condition may be arbitrarily set for the conditions for the update frequency, the movement area, and the barycenter distance. Adjusting the corresponding thresholds for the update frequency, the movement area, and the barycenter distance makes it possible to optimize an operation corresponding to an application and content to be displayed.

Although a case in which the entire screen is converted into a moving image when the conditions for the update frequency and the movement area are satisfied has been described in the first embodiment, other conditions may also be used. For example, the entire screen may be converted into a moving image upon occurrence of a copy event. Although a case in which the entire screen is converted into a moving image when the conditions are satisfied has been described in the first embodiment, only a region in which the window is allowed to move may be converted into a moving image.

The elements in the illustrated apparatuses do not necessarily have to be physically configured as those illustrated. That is, specific forms of separation/integration of the apparatuses are not limited to those illustrated, and all or a portion thereof may be functionally or physically separated or integrated in an arbitrary manner, depending on various loads, a use state, and so on.

For example, the image transmission processing executed by the first image transmitting unit 14f and the second image transmitting unit 14g in the server apparatus 10 may be integrated into one image transmitting unit. The image reception processing executed by the first image receiving unit 23b and the second image receiving unit 23d in the client terminal 20 may also be integrated into one image receiving unit. Additionally, the display control processing executed by the first display controlling unit 23c and the second display controlling unit 23f in the client terminal 20 may also be integrated into one display controlling unit.

Any of the functional units, i.e., the operation-information obtaining unit 14a, the screen generating unit 14b, the frequency-of-changes determining unit 14c, the frequent-change region identifying unit 14d, the encoder 14e, the first image transmitting unit 14f, the second image transmitting unit 14g, the attribute-information transmitting unit 14h, the copy-event controlling unit 14k, and the entire-screen moving-image conversion determining unit 14m, included in the server apparatus 10 may have a configuration other than the above-described configuration. As one exemplary configuration, the functional units may be connected through a network so as to serve as an external apparatus of the server apparatus 10. As another exemplary configuration, those functional units may be provided in respective apparatuses that are connected in a network so as to cooperate with each other to realize the functions of the above-described server apparatus 10. Such a configuration may also be applied to any of the operation-information reporting unit 23a, the first image receiving unit 23b, the first display controlling unit 23c, the second image receiving unit 23d, the decoder 23e, and the second display controlling unit 23f included in the client terminal 20.

Figure 16:
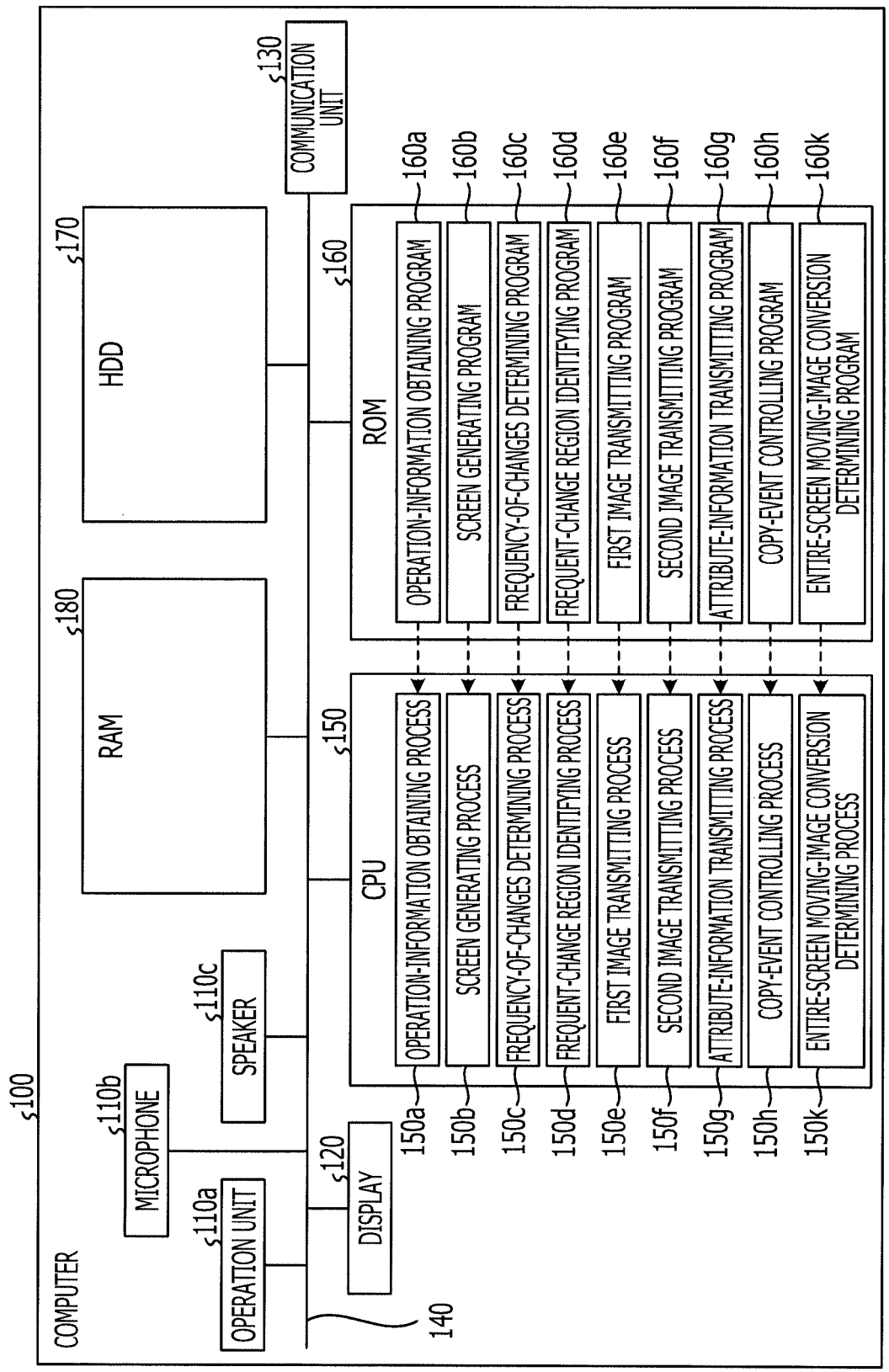
FIG. 16 is a block diagram illustrating one example of a computer for executing image transmission programs according to a second embodiment.

The various types of processing described above in the embodiments may also be realized by causing a computer, such as a personal computer or workstation, to execute a prepared program. Accordingly, one example of a computer for executing image transmission programs having substantially the same functions as those in the above-described embodiment will be described below with reference to FIG. 16. FIG. 16 is a block diagram illustrating one example of a computer for executing image transmission programs according to a second embodiment. While an example of a computer for executing image transmission programs having substantially the same functions as those of the server apparatus 10 will now be described, the description below is also applicable to a case in which a computer executes an image display program having substantially the same functions as those of the client terminal 20.

As illustrated in FIG. 16, a computer 100 in the second embodiment includes an operation unit 110a, a microphone 110b, a speaker 110c, a display 120, and a communication unit 130. The computer 100 further includes a CPU 150, a ROM 160, a HDD (hard disk drive) 170, and a RAM (random access memory) 180. The elements 110a to 180 are connected through a bus 140.

The ROM 160 pre-stores control programs that provide substantially the same functions as those of the operation-information obtaining unit 14a, the screen generating unit 14b, and the frequency-of-changes determining unit 14c illustrated in the first embodiment described above. In addition, the ROM 160 pre-stores control programs that provide substantially the same functions as those of the frequent-change region identifying unit 14d, the first image transmitting unit 14f, the second image transmitting unit 14g, the attribute-information transmitting unit 14h, the copy-event controlling unit 14k, and the entire-screen moving-image conversion determining unit 14m. That is, as illustrated in FIG. 16, the ROM 160 stores an operation-information obtaining program 160a, a screen generating program 160b, a frequency-of-changes determining program 160c, and a frequent-change region identifying program 160d. The ROM 160 further stores a first image transmitting program 160e and a second image transmitting program 160f. The ROM 160 further stores an attribute-information transmitting program 160g, a copy-event controlling program 160h, and an entire-screen moving-image conversion determining program 160k. The programs 160a to 160k may be integrated with each other or may be separated from each other, as in the elements in the server apparatus 10 illustrated in FIG. 1. With respect to data to be stored in the ROM 160, not all of data have to be always stored in the ROM 160 and only data needed for processing may be stored in the ROM 160.

The CPU 150 reads the programs 160a to 160k from the ROM 160 and executes the programs 160a to 160k. Thus, as illustrated in FIG. 16, with respect to the programs 160a to 160d, the CPU 150 functions as an operation-information obtaining process 150a, a screen generating process 150b, a frequency-of-changes determining process 150c, and a frequent-change region identifying process 150d. With respect to the programs 160e and 160f, the CPU 150 also functions as a first image transmitting process 150e and a second image transmitting process 150f. In addition, with respect to the programs 160g to 160k, the CPU 150 functions as an attribute-information transmitting process 150g, a copy-event controlling process 150h, and an entire-screen moving-image conversion determining process 150k. The processes 150a to 150k correspond to the elements in the server apparatus illustrated in FIG. 1. The CPU 150 uses the RAM 180 to execute the image transmission programs. With respect to the processing units virtually realized on the CPU 150, not all of the processing units do no necessarily have to be realized on the CPU 150 and thus only the processing unit(s) needed for processing may be virtually realized.

The image transmission programs do not have to be initially stored in the HDD 170 or the ROM 160. For example, the image transmission programs may be stored on a portable physical medium to be loaded into the computer 100. Examples of the portable physical medium include a flexible medium (the so-called "FD"), a CD-ROM, a DVD disk, a magneto-optical disk, and an IC (integrated circuit) card. The computer 100 may obtain the programs from the portable physical medium to execute the programs. The programs may be stored on another computer or server apparatus connected to the computer 100 through a public line, the Internet, a LAN, or a WAN (wide area network) so that the computer 100 obtains the programs therefrom for execution.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus that generates images for displaying a computer execution result on a display unit of a terminal device connected to the information processing apparatus through a network and that transmits the images to the terminal device, the apparatus comprising:
    a memory configured to hold the images;
    a processor configured to execute a plurality of instructions, the instructions comprising:
    a first transmitting instruction that transmits the images;
    a detecting instruction that divides the images into arbitrary regions and detects a frequency of changes between frames of the images for each of the divided regions; and
    a second transmitting instruction that compresses the images by a compression method and that transmits the compressed images for each of the divided regions in which the frequency detected by the detecting unit is larger than or equal to a predetermined threshold, divided regions having a distance therebetween that is smaller than or equal to a predetermined value being combined into a single combined region for the purpose of compressing and transmitting, the single combined region being a rectangular region that includes the divided regions that are combined and an interpolation region that is fit into a gap between the divided regions that are combined, a compression method being performed by the second transmitting being different from a compression method being performed by the first transmitting.

2. The apparatus according to claim 1,
    wherein, when a predetermined period of time passes after the images are stored in the memory, the processor detects a frequency of changes between the frames of the images.

3. An information processing apparatus that generates images to be displayed on a display unit of a terminal device connected to the information processing apparatus through a network and that transmits the images to the terminal device, the apparatus comprising:
    a memory configured to hold the images;
    a processor configured to execute a plurality of instructions, the instructions comprising:
    a first transmitting instruction that transmits the images;
    a detecting instruction that divides the images into arbitrary regions and detects a copy event based on changes in each divided region of the images;
    a comparing instruction that compares a size of a copy region indicated by the copy event with a predetermined threshold size; and
    a second transmitting instruction that compresses a moveable region including a range in which the copy region is moved by using a compression method and transmits the compressed moveable region for each of the divided regions in which the size of the copy region is larger than or equal to the predetermined threshold size, divided regions having a distance therebetween that is smaller than or equal to a predetermined value being combined into a single combined region for the purpose of compressing and transmitting, the single combined region being a rectangular region that includes the divided regions that are combined and an interpolation region that is fit into a gap between the divided regions that are combined, the compression method being used by the second transmitting being different from a compression method being used by the first transmitting.

4. The apparatus according to claim 3,
    wherein the processor detects the copy event on a basis of changes in the images when a predetermined period of time passes after the images are stored in the memory.

5. A non-transitory computer-readable storage medium storing an image transmission program that causes a computer to generate images to be displayed on a display unit of a terminal device connected to the computer through a network and that transmits the images to the terminal device, the image transmission program causing the computer to execute a process comprising:
    first transmitting of transmitting images rendering an execution result of the computer, the images being rendered in an image memory;
    dividing the images into arbitrary regions and detecting a frequency of changes between frames of the images for each of the divided regions; and
    compressing the images by a compression method and second transmitting the compressed images for each of the divided regions in which the frequency detected in the detecting is larger than or equal to a predetermined threshold, divided regions having a distance therebetween that is smaller than or equal to a predetermined value being combined into a single combined region for the purpose of compressing and transmitting, the single combined region being a rectangular region that includes the divided regions that are combined and an interpolation region that is fit into a gap between the divided regions that are combined, the compression method being performed prior to the second transmitting being different from a compression method being performed before the first transmitting.

6. The non-transitory computer-readable storage medium according to claim 5,
wherein, in the detecting, a copy event is detected from changes for each of the divided regions.

7. The non-transitory computer-readable storage medium according to claim 5,
wherein, when a predetermined period of time passes after the images are stored in the image memory, a frequency of changes between the frames of the images is detected in the detecting.

8. A non-transitory computer-readable storage medium storing an image display program that causes a computer to receive images for displaying an execution result of an information processing apparatus connected to the computer through a network and to display the received images on a display unit, the image display program causing the computer to execute a process comprising:
first receiving of receiving images rendering an execution result of the computer, the images being divided into arbitrary regions and a frequency of changes between frames of the images being detected for each of the divided regions;
second receiving of receiving images compressed by a compression method that is different from a compression method for the images received in the first receiving when a frequency of changes between frames of the images for each of the divided regions rendering the execution result of the computer is larger than or equal to a predetermined threshold, divided regions having a distance therebetween that is smaller than or equal to a predetermined value being combined into a single combined region for the purpose of compressing, the single combined region being a rectangular region that includes the divided regions that are combined and an interpolation region that is fit into a gap between the divided regions that are combined;
first display controlling of displaying, on the display unit, the images received in the first receiving; and
second display controlling of decoding the images received in the second receiving and displaying the decoded images on the display unit.

* * * * *

UNITED STATES PATENT AND TRADEMARK OFFICE
CERTIFICATE OF CORRECTION

| | | |
|---|---|---|
| PATENT NO. | : 8,953,676 B2 | Page 1 of 1 |
| APPLICATION NO. | : 13/165075 | |
| DATED | : February 10, 2015 | |
| INVENTOR(S) | : Kazuki Matsui et al. | |

It is certified that error appears in the above-identified patent and that said Letters Patent is hereby corrected as shown below:

In the Claims
Column 25, Line 55, after "detecting" delete "unit".

Signed and Sealed this
Thirtieth Day of June, 2015

Michelle K. Lee
*Director of the United States Patent and Trademark Office*